(12) United States Patent
Mortensen et al.

(10) Patent No.: US 9,789,587 B1
(45) Date of Patent: Oct. 17, 2017

(54) LEACHING ASSEMBLIES, SYSTEMS, AND METHODS FOR PROCESSING SUPERABRASIVE ELEMENTS

(71) Applicant: US Synthetic Corporation, Orem, UT (US)

(72) Inventors: Daniel Call Mortensen, Provo, UT (US); Trevor Allen Olsen, Pleasant Grove, UT (US); Heather Marie Schaefer, North Ogden, UT (US); Daniel Preston Wilding, Springville, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 42 days.

(21) Appl. No.: 14/108,324

(22) Filed: Dec. 16, 2013

(51) Int. Cl.
| | | |
|---|---|---|
| *B24D 3/00* | (2006.01) | |
| *B08B 3/08* | (2006.01) | |
| *C22B 3/06* | (2006.01) | |
| *C01B 31/06* | (2006.01) | |
| *E21B 10/46* | (2006.01) | |

(52) U.S. Cl.
CPC ............. *B24D 3/005* (2013.01); *B08B 3/08* (2013.01); *C01B 31/06* (2013.01); *C22B 3/06* (2013.01); *E21B 10/46* (2013.01)

(58) Field of Classification Search
CPC .......... B24D 3/00; B24D 11/00; B24D 3/005; C09K 3/14; C23F 1/10; C23F 1/44;
(Continued)

(56) References Cited

U.S. PATENT DOCUMENTS

| 3,136,615 A | 6/1964 | Bovernkerk et al. |
|---|---|---|
| 3,141,746 A | 7/1964 | De Lai et al. |

(Continued)

FOREIGN PATENT DOCUMENTS

| EP | 0196777 | 10/1986 |
|---|---|---|
| EP | 0300699 | 1/1989 |

(Continued)

OTHER PUBLICATIONS

Nakamura, T. et al.; Study on th eHeat Deterioration Mechanism of Sintered Diamond; Program and Abstracts of the 27th High Pressure Conference of Japan; Oct. 13-15, 1986; Sapporo.
(Continued)

*Primary Examiner* — Matthew E Hoban
*Assistant Examiner* — Alexandra M Moore
(74) *Attorney, Agent, or Firm* — Fisherbroyles, LLP

(57) ABSTRACT

A polycrystalline diamond element leaching assembly includes a polycrystalline diamond element, a protective leaching cup surrounding at least a portion of the polycrystalline diamond element, and a protective layer positioned between the polycrystalline diamond element and the protective leaching cup. A method of processing a polycrystalline diamond element includes covering a selected portion of a polycrystalline diamond element with a curable resin layer, curing the curable resin layer to form a protective layer, and exposing at least a portion of the polycrystalline diamond element to a leaching agent. Another method of processing a polycrystalline diamond element includes depositing a curable resin within a protective leaching cup and positioning a polycrystalline diamond element within the protective leaching cup such that the curable resin is displaced so as to surround at least a portion of the polycrystalline diamond element.

16 Claims, 16 Drawing Sheets

(58) Field of Classification Search
CPC . C23F 1/14; E21B 10/44; E21B 10/56; E21B 10/00; E21B 10/54; E21B 10/55; C22B 3/00; C22B 3/02; C22B 3/06; B23B 27/14; B05D 5/00
See application file for complete search history.

(56) References Cited

U.S. PATENT DOCUMENTS

| | | |
|---|---|---|
| 3,233,988 A | 2/1966 | Wentorf et al. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,410,054 A | 10/1983 | Nagel et al. |
| 4,412,980 A | 11/1983 | Tsuji et al. |
| 4,468,138 A | 8/1984 | Nagel |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,731,296 A | 3/1988 | Kikuchi et al. |
| 4,738,322 A | 4/1988 | Hall et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,811,801 A | 3/1989 | Salesky et al. |
| 4,828,582 A | 5/1989 | Frushour |
| 4,844,185 A | 7/1989 | Newton, Jr. et al. |
| 4,854,405 A | 8/1989 | Stroud |
| 4,861,350 A | 8/1989 | Phaal et al. |
| 4,871,377 A | 10/1989 | Frushour |
| 4,899,922 A | 2/1990 | Slutz et al. |
| 4,913,247 A | 4/1990 | Jones |
| 4,919,220 A | 4/1990 | Fuller et al. |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,016,718 A | 5/1991 | Tandberg |
| 5,027,912 A | 7/1991 | Juergens |
| 5,030,276 A | 7/1991 | Sung et al. |
| 5,092,687 A | 3/1992 | Hall |
| 5,096,465 A | 3/1992 | Chen et al. |
| 5,116,568 A | 5/1992 | Sung et al. |
| 5,120,327 A | 6/1992 | Dennis |
| 5,127,923 A | 7/1992 | Bunting et al. |
| 5,135,061 A | 8/1992 | Newton, Jr. |
| 5,154,245 A | 10/1992 | Waldenstrom et al. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom et al. |
| 5,337,844 A | 8/1994 | Tibbitts |
| 5,355,969 A | 10/1994 | Hardy et al. |
| 5,364,192 A | 11/1994 | Damm et al. |
| 5,368,398 A | 11/1994 | Damm et al. |
| 5,370,195 A | 12/1994 | Keshavan et al. |
| 5,379,853 A | 1/1995 | Lockwood et al. |
| 5,439,492 A | 8/1995 | Anthony et al. |
| 5,447,208 A | 9/1995 | Lund et al. |
| 5,460,233 A | 10/1995 | Meany et al. |
| 5,464,068 A | 11/1995 | Najafi-Sani |
| 5,468,268 A | 11/1995 | Tank et al. |
| 5,480,233 A | 1/1996 | Cunningham |
| 5,496,638 A | 3/1996 | Waldenstrom et al. |
| 5,496,639 A | 3/1996 | Connell et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,544,713 A | 8/1996 | Dennis |
| 5,560,716 A | 10/1996 | Tank et al. |
| 5,607,024 A | 3/1997 | Keith et al. |
| 5,620,302 A | 4/1997 | Garrison et al. |
| 5,620,382 A | 4/1997 | Cho et al. |
| 5,624,068 A | 4/1997 | Waldenstrom et al. |
| 5,645,617 A | 7/1997 | Frushor |
| 5,653,300 A | 8/1997 | Lund et al. |
| 5,667,028 A | 9/1997 | Traux et al. |
| 5,718,948 A | 2/1998 | Ederyd et al. |
| 5,722,497 A | 3/1998 | Gum et al. |
| 5,722,499 A | 3/1998 | Nguyen et al. |
| 5,759,216 A | 6/1998 | Kanada et al. |
| 5,776,615 A | 7/1998 | Wong et al. |
| 5,833,021 A | 11/1998 | Mensa-Wilmot et al. |
| 5,875,862 A | 3/1999 | Jurewicz et al. |
| 5,897,942 A | 4/1999 | Karner et al. |
| 5,944,129 A | 8/1999 | Jensen |
| 5,954,147 A | 9/1999 | Overstreet et al. |
| 5,967,250 A | 10/1999 | Lund et al. |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,145,608 A | 11/2000 | Lund et al. |
| 6,193,001 B1 | 2/2001 | Eyre et al. |
| 6,234,261 B1 | 5/2001 | Evans et al. |
| 6,248,447 B1 | 6/2001 | Griffin et al. |
| 6,269,894 B1 | 8/2001 | Griffin |
| 6,290,726 B1 | 9/2001 | Pope et al. |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,528,159 B1 | 3/2003 | Kanada et al. |
| 6,544,308 B2 | 4/2003 | Griffin et al. |
| 6,550,556 B2 | 4/2003 | Middlemiss et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,793,681 B1 | 9/2004 | Pope et al. |
| 6,797,326 B2 | 9/2004 | Griffin et al. |
| 6,861,098 B2 | 3/2005 | Griffin et al. |

(56) References Cited

U.S. PATENT DOCUMENTS

| | | |
|---|---|---|
| 6,878,447 B2 | 4/2005 | Griffin et al. |
| 6,892,836 B1 | 5/2005 | Eyre et al. |
| 6,904,984 B1 | 6/2005 | Estes et al. |
| 6,935,444 B2 | 8/2005 | Lund et al. |
| 6,962,214 B2 | 11/2005 | Hughes et al. |
| 6,991,049 B2 | 1/2006 | Eyre et al. |
| 7,350,601 B2 | 4/2008 | Belnap et al. |
| 7,377,341 B2 | 5/2008 | Middlemiss et al. |
| 7,506,698 B2 | 3/2009 | Eyre et al. |
| 7,517,589 B2 | 4/2009 | Eyre |
| 7,568,534 B2 | 8/2009 | Griffin et al. |
| 7,608,333 B2 | 10/2009 | Eyre |
| 7,754,333 B2 | 7/2010 | Eyre et al. |
| 8,147,572 B2 | 4/2012 | Eyre et al. |
| 2005/0115744 A1 | 6/2005 | Griffin et al. |
| 2005/0129950 A1 | 6/2005 | Griffin et al. |
| 2005/0139397 A1 | 6/2005 | Achilles et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060391 A1 | 3/2006 | Eyre et al. |
| 2006/0086540 A1 | 4/2006 | Griffin et al. |
| 2006/0162969 A1 | 7/2006 | Belnap et al. |
| 2007/0039762 A1 | 2/2007 | Achilles |
| 2007/0181348 A1 | 8/2007 | Lancaster et al. |
| 2007/0187155 A1 | 8/2007 | Middlemiss |
| 2009/0152016 A1 | 6/2009 | Eyre et al. |
| 2011/0056141 A1 | 3/2011 | Miess et al. |
| 2011/0266059 A1* | 11/2011 | DiGiovanni ......... B24D 99/005 175/57 |
| 2012/0151847 A1* | 6/2012 | Ladi et al. ...................... 51/307 |
| 2012/0247841 A1* | 10/2012 | Tessitore ................ C22C 26/00 175/428 |
| 2013/0068534 A1* | 3/2013 | DiGiovanni et al. ......... 175/428 |

FOREIGN PATENT DOCUMENTS

| | | |
|---|---|---|
| EP | 0329954 | 8/1989 |
| EP | 0500253 | 8/1992 |
| EP | 0595630 | 5/1994 |
| EP | 0612868 | 8/1994 |
| EP | 0617207 | 9/1994 |
| EP | 0787820 | 8/1997 |
| EP | 0860515 | 8/1998 |
| EP | 1190791 | 3/2002 |
| GB | 1349385 | 4/1974 |
| GB | 2048927 | 12/1980 |
| GB | 2268768 | 1/1994 |
| GB | 2323398 | 9/1998 |
| GB | 2418215 | 3/2006 |
| GB | 2422394 | 7/2006 |
| JP | 59-35066 | 2/1984 |
| JP | 61-67740 | 10/1984 |
| JP | 59-219500 | 12/1984 |
| JP | 07-62468 | 3/1985 |
| JP | 61-125739 | 6/1986 |
| JP | 63-069971 | 9/1986 |
| JP | 63-55161 | 8/1987 |
| JP | 07-156003 | 11/1993 |
| JP | 11-245103 | 9/1999 |
| JP | 2000-087112 | 3/2000 |
| RU | 2034937 | 5/1995 |
| RU | 566439 | 7/2000 |
| WO | 93/23204 | 11/1993 |
| WO | 96/34131 | 10/1996 |
| WO | 00/28106 | 5/2000 |
| WO | 2004/040095 | 5/2004 |
| WO | 2004/106003 | 12/2004 |
| WO | 2004/106004 | 12/2004 |

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.

* cited by examiner

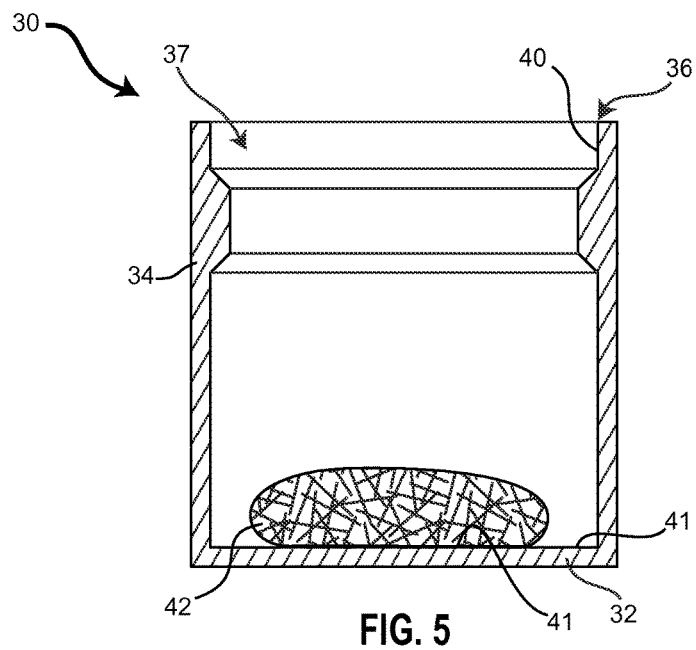
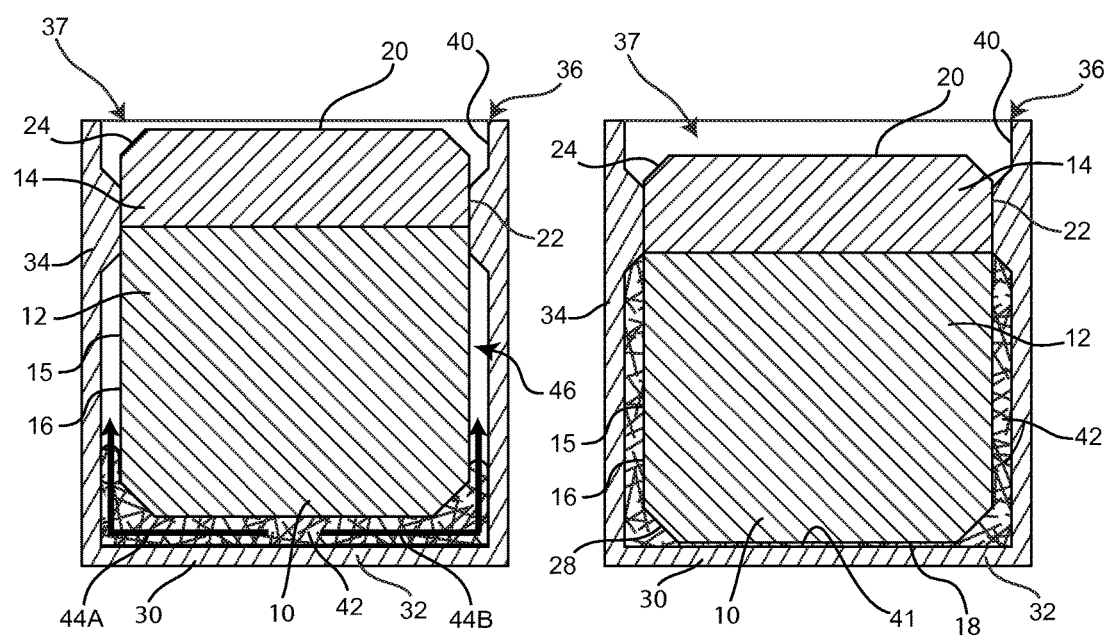
FIG. 5
FIG. 6
FIG. 7

LEACHING ASSEMBLIES, SYSTEMS, AND METHODS FOR PROCESSING SUPERABRASIVE ELEMENTS

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements, which may include bearing elements utilized in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

Conventional chemical leaching techniques often involve the use of highly concentrated and corrosive solutions, such as highly acidic solutions, to dissolve and remove metal-solvent catalysts from polycrystalline diamond materials. However, in addition to dissolving metal-solvent catalysts from a PCD material, leaching solutions may also dissolve any accessible portions of a substrate to which the PCD material is attached. For example, highly acidic leaching solutions may dissolve any accessible portions of a cobalt-cemented tungsten carbide substrate, causing undesired pitting and/or other corrosion of the substrate surface.

In some conventional leaching techniques, a polymeric leaching cup may be placed around a portion of a PCD element or other PCD article to protect the substrate from a leaching solution. A polymeric leaching cup may, for example, surround the substrate surface and a portion of the PCD layer near the substrate. Such leaching cups may, however, provide inadequate protection during leaching. For example, the manufacturing process used to produce polymeric leaching cups can result in cups with tears, uneven diameter distributions, inconsistent plastic quality, and other flaws. Additionally leaching cups may be damaged during the leaching process. Leaching cups may be torn or otherwise damaged (e.g., torn seals) by an edge or chamfer portion of the PCD article during loading of a PCD article into a leaching cup. Additionally, pinholes may be formed in a leaching cup during ejection of the PCD article from a leaching apparatus following a leaching procedure. A leaching solution may also enter between the leaching cup and the PCD article such that a portion of the substrate of the PCD article is exposed to the leaching solution. Exposure to a leaching solution may result in undesired corrosion and/or damage to PCD substrates.

Accordingly, conventional leaching cups may only provide PCD articles with limited protection from leaching solutions, and such leaching cups may not provide adequate protection under various leaching conditions that are required in order to leach interstitial materials from the PCD articles to a desired degree. For example, in order to leach PCD articles to certain leach specifications, the PCD articles may be exposed to leaching solutions for extended periods of time and/or the PCD articles may be exposed to the leaching solutions under various temperature and/or pressure conditions. Additionally, leaching solutions may diffuse through conventional leaching cups throughout the course of the leaching procedure such that a portion of the substrate of the PCD article is exposed to the leaching solution.

While various temperatures, pressures, and/or leach times may enable leaching of a PCD article to a greater degree, such conditions may undesirably cause passage of a leaching solution between the PCD article and a shielding cup surrounding the PCD article, increasing contact between the leaching solution and a substrate or other protected part of the PCD article. Various temperatures, pressures, and/or leach times may also accelerate the rate at which the leaching solutions attack substrate materials, such as carbide materials, resulting in excessive corrosion and/or damage to the substrates.

SUMMARY

The instant disclosure is directed to exemplary leaching assembly systems, leaching assemblies, and methods for processing polycrystalline diamond elements. According to at least one embodiment, a method of processing a polycrystalline diamond element comprising a polycrystalline diamond table bonded to a substrate may comprise covering a selected portion of a polycrystalline diamond element with a curable resin layer, curing the curable resin layer to form a protective layer on the selected portion of the polycrystalline diamond element, and exposing at least a portion of the polycrystalline diamond element to a leaching agent such that the leaching agent contacts an exposed surface region of the polycrystalline diamond table and at least a portion of the protective layer.

Curing the curable resin layer may comprise exposing the curable resin layer to at least one of a light source, including a visible light source and/or an ultraviolet light source. In various embodiments, curing the curable resin layer may comprise heating a resin layer, such as an epoxy resin layer, to at least a threshold temperature. In some embodiments, the curable resin layer may further comprise at least one of a hardener and an accelerator. Curing the curable resin layer may occur after exposing at least the portion of the polycrystalline diamond element to the leaching agent. Optionally, curing the curable resin layer may occur during and/or following exposing at least the portion of the polycrystalline diamond element to the leaching agent.

According to at least one embodiment, coating the selected portion of the polycrystalline diamond element with the curable resin layer may comprise at least one of spraying the curable resin layer onto the selected portion of the polycrystalline diamond element, painting the curable resin layer onto the selected portion of the polycrystalline diamond element, dipping the polycrystalline diamond element in the curable resin layer and casting the curable resin layer on the polycrystalline diamond element.

The polycrystalline diamond element may comprise a polycrystalline diamond table. In some embodiments, the selected portion may comprise at least a portion of a surface of the polycrystalline diamond table. In additional embodiments, the polycrystalline diamond element may further comprise a substrate bonded to the polycrystalline diamond table, and the selected portion may comprise at least a portion of a surface of the substrate. In some embodiments, the polycrystalline diamond element coated with the protective layer may be positioned within a protective leaching cup prior to exposing at least a portion of the polycrystalline diamond element to the leaching agent.

According to some embodiments, a method of processing a polycrystalline diamond element may comprise depositing a curable resin within a protective leaching cup and positioning a polycrystalline diamond element within the protective leaching cup such that the curable resin is displaced so as to surround at least a portion of the polycrystalline diamond element. The method may further comprise curing the curable resin to form a protective layer on at least a portion of the polycrystalline diamond element and then exposing at least a portion of the polycrystalline diamond element to a leaching agent such that the leaching agent contacts an exposed surface region of the polycrystalline diamond element.

The protective leaching cup may comprise a rear wall, an opening defined in a portion of the protective leaching cup opposite the rear wall, and a side wall extending between the opening and the rear wall, the side wall and the rear wall defining a cavity within the protective leaching cup. Depositing the volume of the curable resin within the protective leaching cup may comprise depositing the volume of the curable resin adjacent the rear wall of the protective leaching cup. In some embodiments, the side wall of the protective leaching cup may comprise a seal region adjacent a first inner diameter and an encapsulating region extending between the seal region and the rear wall, the encapsulating region having a second inner diameter that is greater than the first inner diameter. Positioning the polycrystalline diamond element within the protective leaching cup may comprise positioning the polycrystalline diamond element such that the seal region contacts a portion of the polycrystalline diamond element and the curable resin is disposed within the encapsulating region so as to surround at least a portion of the polycrystalline diamond element.

According to at least one embodiment, the polycrystalline diamond element may comprise a cutting face, a rear face opposite the cutting face, and a side surface extending between the cutting face and the rear face. Positioning the polycrystalline diamond element within the protective leaching cup comprises forcing the polycrystalline diamond element against the curable resin such that the curable is displaced within the encapsulating region of the protective leaching cup so as to be disposed adjacent to at least a portion of the rear face of the polycrystalline diamond element and at least a portion of the side surface of the polycrystalline diamond element. The seal region of the protective leaching cup may tightly surround at least a portion of the side surface of the polycrystalline diamond element so as to form a seal between the seal region and the side surface.

In some embodiments, curing the curable resin layer may comprise exposing the curable resin layer to a light source. For example, the protective leaching cup may comprise a light-transmissive material and curing the curable resin may comprise exposing the curable resin layer to light from the light source transmitted through the protective leaching cup.

In some embodiments, curing the curable resin layer may comprise heating the curable resin layer to at least a threshold temperature. Additionally, exposing at least the portion of the polycrystalline diamond element to the leaching agent may comprise submerging at least the portion of the polycrystalline diamond element and at least a portion of the protective leaching cup in the leaching agent.

According to certain embodiments, a method of processing a polycrystalline diamond element comprising a polycrystalline diamond table bonded to a substrate may comprise coating a selected portion of a polycrystalline diamond element with a coating solution comprising a dissolved resin, the polycrystalline diamond element comprising a polycrystalline diamond table, evaporating a portion of the coating solution to form a protective layer on the selected portion of the polycrystalline diamond element, and then exposing at least a portion of the polycrystalline diamond element to a leaching agent such that the leaching agent contacts an exposed surface region of the polycrystalline diamond table. In some embodiments, the coating solution may comprise a dissolved fluorine resin.

According to various embodiments, a polycrystalline diamond element leaching assembly may comprise a polycrystalline diamond element, a protective leaching cup surrounding at least a portion of the polycrystalline diamond element, and a curable resin layer positioned between the polycrystalline diamond element and the protective leaching cup. In some embodiments, the curable resin layer may comprise a fluorine resin material.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a cross-sectional side view of an exemplary protective leaching cup having a curable resin deposited therein according to at least one embodiment.

FIG. 6 is a cross-sectional side view of an exemplary superabrasive element disposed in the exemplary protective leaching cup illustrated in FIG. 5.

FIG. 7 is a cross-sectional side view of an exemplary superabrasive element inserted into the exemplary protective leaching cup illustrated in FIG. 5.

Figure 1:
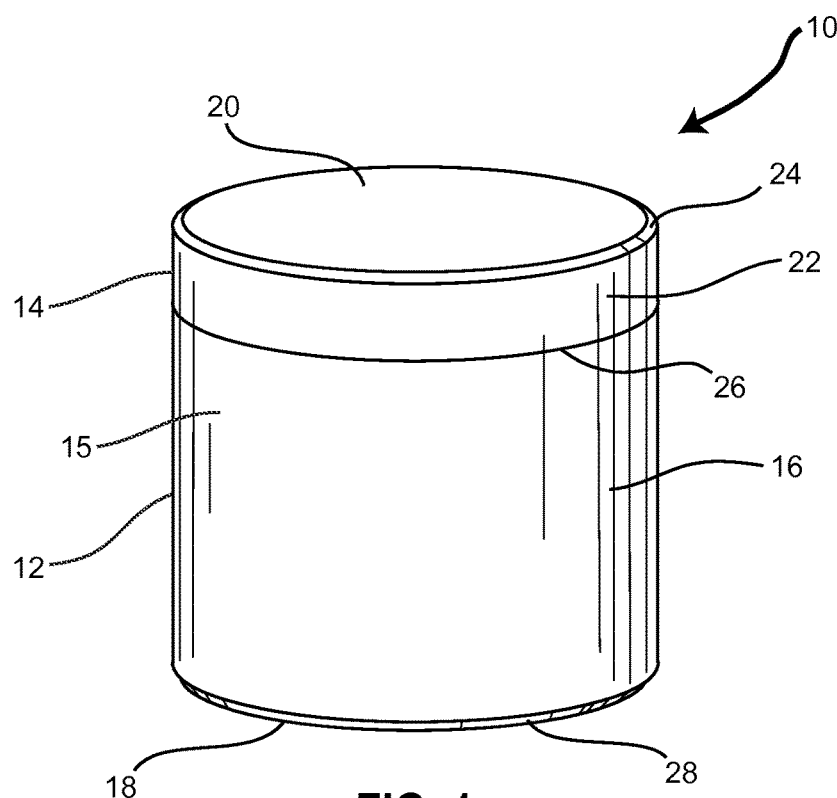
FIG. 1 is a perspective view of an exemplary superabrasive element including a substrate and a superabrasive table according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary assemblies, systems, and methods for processing polycrystalline diamond elements. Such polycrystalline diamond elements may be used as cutting elements for use in a variety of applications, such as drilling tools, machining equipment, cutting tools, and other apparatuses, without limitation. Polycrystalline diamond elements, as disclosed herein, may also be used as bearing elements in a variety of bearing applications, such as thrust bearings, radial bearings, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. The term "cutting," as used herein, may refer to machining processes, drilling processes, boring processes, and/or any other material removal process utilizing a cutting element and/or other cutting apparatus, without limitation.

Figure 2:
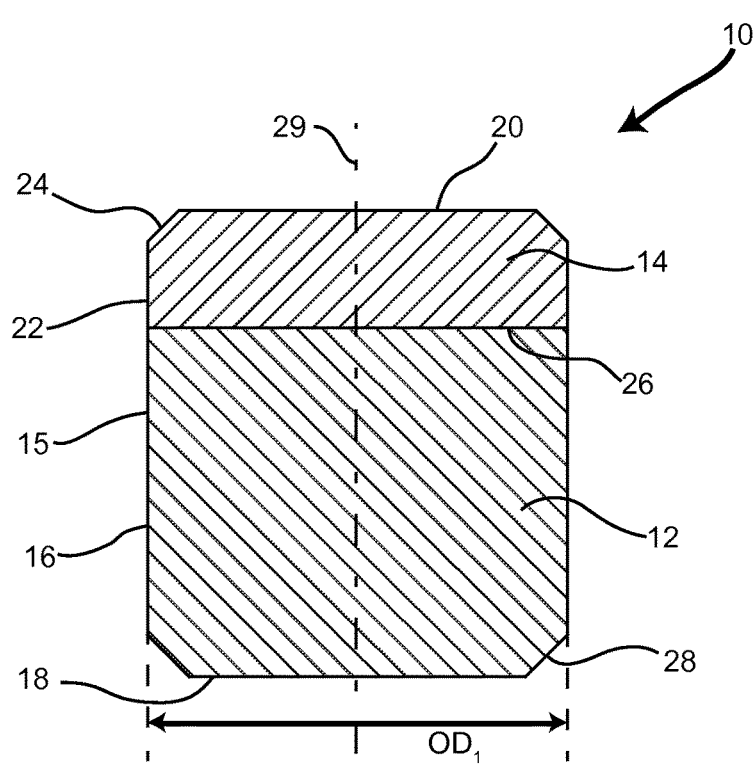
FIG. 2 is a cross-sectional side view of the exemplary superabrasive element illustrated in FIG. 1.

FIGS. 1 and 2 illustrate an exemplary superabrasive element 10 according to at least one embodiment. As illustrated in FIGS. 1 and 2, superabrasive element 10 may comprise a superabrasive table 14 affixed to or formed upon a substrate 12. Superabrasive table 14 may be affixed to substrate 12 at interface 26. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12.

Superabrasive element 10 may also comprise a superabrasive face 20 and a superabrasive chamfer 24 (i.e., sloped or angled) formed by superabrasive table 14. Superabrasive chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of superabrasive chamfer 24 and superabrasive face 20 and/or at the intersection of superabrasive chamfer 24 and superabrasive side surface 22.

In some embodiments, superabrasive element 10 may be utilized as a cutting element for a drill bit, in which superabrasive chamfer 24 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 20 acting as bearing surface) configured to contact oppositely facing bearing elements.

According to various embodiments, superabrasive element 10 may also comprise a substrate chamfer 28 formed by substrate 12. Substrate chamfer 28 may comprise an angular and/or rounded edge formed at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing. At least one edge may also be formed at the intersection of substrate chamfer 28 and rear surface 18 and/or at the intersection of substrate chamfer 28 and substrate side surface 16.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 29 extending through superabrasive element 10, as illustrated in FIGS. 1 and 2. For example, substrate side surface 16 and superabrasive side surface 22 may be substantially cylindrical and may have any suitable diameters relative to central axis 29, without limitation. According to various embodiments, substrate side surface 16 and superabrasive side surface 22 may have substantially the same outer diameter relative to central axis 29.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, and/or mixtures or composites including one or more of the foregoing materials, without limitation.

Superabrasive table 14 may be formed using any suitable technique. According to some embodiments, superabrasive table 14 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution.

Following sintering, various materials, such as a metal-solvent catalyst, remaining in interstitial regions within the as-sintered PCD body may reduce the thermal stability of superabrasive table 14 at elevated temperatures. In some embodiments, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from the as-sintered PCD body may improve the heat resistance and/or thermal stability of superabrasive table 14, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superabrasive table 14. Removing a metal-solvent catalyst from the as-sintered PCD body may reduce damage to the PCD material of superabrasive table 14 caused by thermal expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form superabrasive table 14 comprising a PCD table. For example, the as-sintered PCD body may be immersed in the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superabrasive table 14. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, superabrasive table 14 may comprise a volume of PCD material that is substantially free of a metal-solvent catalyst.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes) without limitation.

Figure 3:
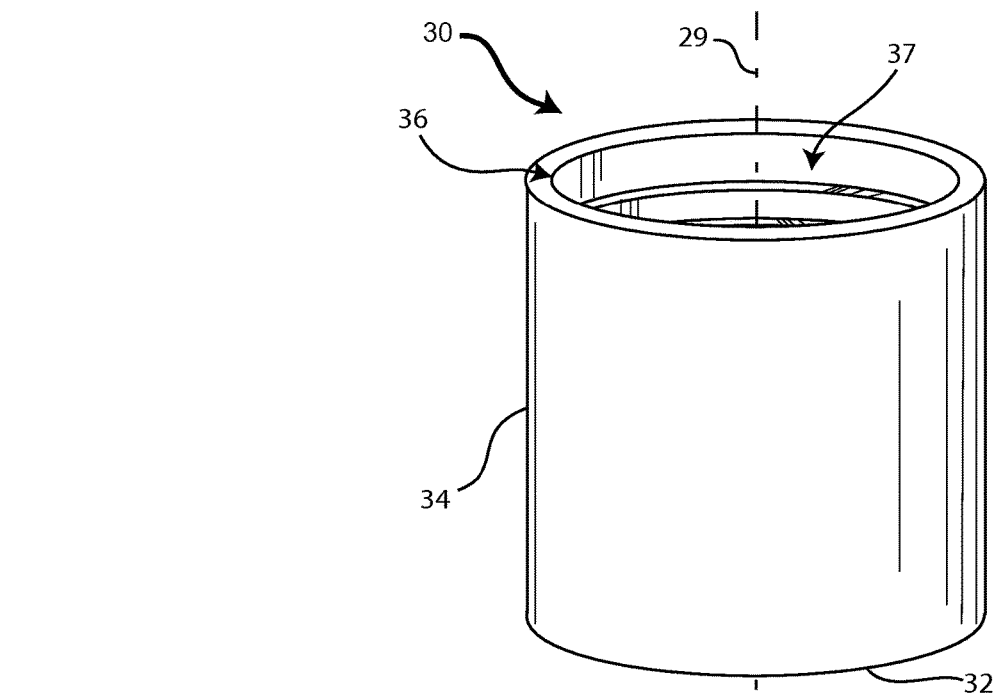
FIG. 3 is a perspective view of an exemplary protective leaching cup according to at least one embodiment.
Figure 4:
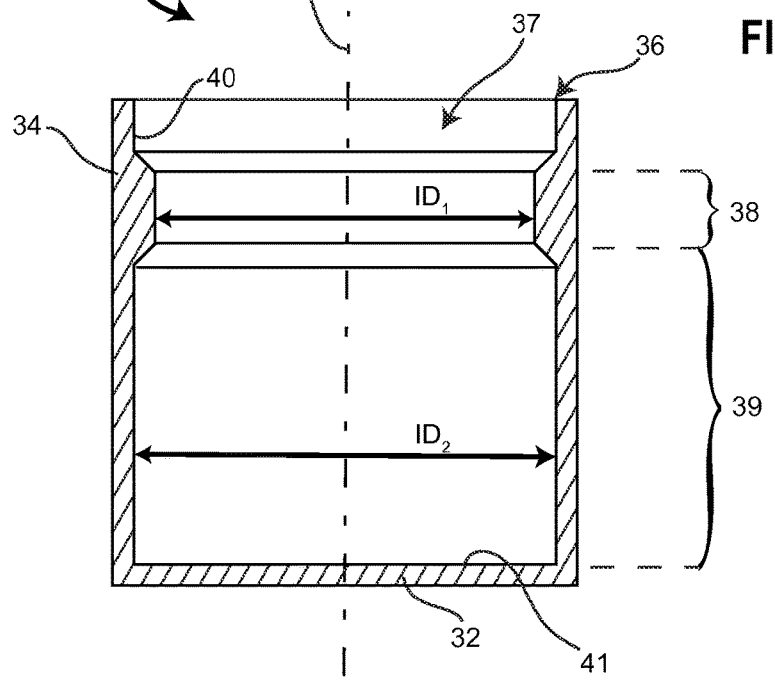
FIG. 4 is a cross-sectional side view of the exemplary protective leaching cup illustrated in FIG. 3.

FIGS. 3 and 4 illustrate an exemplary protective leaching cup 30 according to at least one embodiment. As illustrated in FIGS. 3 and 4, protective leaching cup 30 may comprise a rear wall 32 and a side wall 34 defining a cavity 37 extending from opening 36. Protective leaching cup 30 may be formed of any suitable material, without limitation. For example, protective leaching cup 30 may comprise a flexible, elastic, malleable, and/or otherwise deformable material configured to surround and/or contact at least a portion of superabrasive element 10 and/or a protective layer 48 formed on at least a portion of superabrasive element 10. Protective leaching cup 30 may prevent damage to superabrasive element 10 when at least a portion of superabrasive element 10 is exposed to various reactive agents. For example, protective leaching cup 30 may prevent a leaching solution from chemically damaging certain portions of superabrasive element 10, such as portions of substrate 12, portions of superabrasive table 14, or both, during leaching.

In various embodiments, protective layer 30 may comprise one or more materials that are substantially inert and/or otherwise resistant to acids, bases, and/or other reactive components present in a leaching solution used to leach superabrasive element 10. In some embodiments, protective layer 30 may comprise one or more materials exhibiting significant stability at various temperatures and/or pressures, including elevated temperatures and/or pressures used in leaching and/or otherwise processing superabrasive element 10. In some embodiments, protective leaching cup 30 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, protective leaching cup 30 may comprise PTFE blended with one or more other polymeric materials.

According to some embodiments, protective leaching cup 30 may comprise a material that permits at least a portion of incident light to pass therethrough. In some embodiments, protective leaching cup 30 may comprise a semitransparent material, partially transparent material, or semiopaque material that allows at least a portion of light outside of protective leaching cup 30 to pass through a wall of protective leaching cup 30 and into cavity 37. In certain embodiments, protective leaching cup 30 may also comprise a material that is opaque to certain light wavelengths, such as visible light, but which is semi-transparent with respect to other light wavelengths, such as light in the ultraviolet spectrum, such as near-ultraviolet light. Protective leaching cup 30 may be formed using any suitable technique. For example, protective leaching cup 30 may comprise a polymeric material that is shaped through a molding process (e.g., injection molding, blow molding, compression molding, drawing, etc.) and/or a machining process (e.g., grinding, lapping, milling, boring, etc.).

In at least one embodiment, protective leaching cup 30 may comprise a material that is configured to conform to an exterior portion of superabrasive element 10. For example, protective leaching cup 30 may include a malleable and/or elastically deformable material that conforms to an exterior shape of a portion of superabrasive table 14 abutting protective leaching cup 30, such as superabrasive side surface 22. According to some embodiments, protective leaching cup 30 may comprise a material, such as a polymeric material (e.g., elastomer, rubber, plastic, etc.), that conforms to surface imperfections of superabrasive side surface 22 and/or side surface 16. Heat and/or pressure may be applied to protective leaching cup 30 to cause a portion of protective leaching cup 30 abutting superabrasive side surface 22 to more closely conform to superabrasive side surface 22. Accordingly, a seal between superabrasive side surface 22 and a portion of protective leaching cup 30 abutting superabrasive side surface 22 may be improved, thereby inhibiting passage of a leaching agent between superabrasive element 10 and protective leaching cup 30.

Protective leaching cup 30 may comprise any suitable size, shape and/or geometry, without limitation. In at least one embodiment, portions of protective leaching cup 30 may have a substantially cylindrical outer periphery surrounding central axis 29, as illustrated in FIGS. 3 and 4. Rear wall 32 and side wall 34 may define a cavity 37 within protective leaching cup 30. Cavity 37 may be shaped to surround at least a portion of superabrasive element 10, as described in greater detail below (see, e.g., FIGS. 6-8). Opening 36 may be defined in a portion of protective leaching cup 30 opposite rear wall 32 such that cavity 37 extends between opening 36 and rear wall 32.

As illustrated in FIG. 4, cavity 38 may be defined by an inner side surface 40 of side wall 34 and an inner rear surface 41 of rear wall 32. According to various embodiments, protective leaching cup 30 may comprise a seal region 38 and an encapsulating region 39. Seal region 38 may be adjacent opening 36 and encapsulating region 39 may extend from seal region 38 and may include rear wall 32. According to some embodiments, a portion of side wall 34 in seal region 38 may have a different diameter and/or shape than a portion of side wall 34 in encapsulating region 39. For example, as shown in FIG. 4, a portion of side wall 34 in encapsulating region 39 may have an inner diameter $ID_2$ that is greater than an inner diameter $ID_1$ of a portion of side wall 34 in seal region 38 relative to central axis 29.

FIG. 5-7 illustrate positioning of an exemplary superabrasive element 10 in a protective leaching cup 30 having a curable material 42 disposed therein according to at least one embodiment. As shown in FIG. 5, prior to positioning superabrasive element 10 with protective leaching cup 30, a volume of curable material 42 may be disposed within protective leaching cup 30. Curable material 42 may be disposed within any suitable portion of protective leaching cup 30. For example, as shown in FIG. 5, curable material 42 may be disposed within encapsulating region 39 on inner rear surface 41 of rear wall 32.

Curable material 42 may comprise any suitable material or combination of materials, such as, for example, a curable resin compound. In at least one embodiment, curable material 42 may comprise a resin, gel, elastomer, and/or solution that includes one or more monomeric, oligomeric, and/or polymeric constituents that at least partially polymerize and/or at least partially cross-link to form a hardened polymeric material during a hardening, curing, and/or vulcanization process. Curable material 42 may, for example, include any suitable resin material that is curable by exposure to chemical additives, light, electromagnetic radiation, ultraviolet radiation, electron beam radiation, heat, any other suitable curing agent, or any suitable combination of the foregoing, without limitation. Curable material 42 may comprise one or more polymerizable and/or cross-linkable components including, for example, monomeric, oligomeric, and/or polymeric molecules having one or more epoxide, ester, acryloyl, cyanate, isocyanate, cyanoacrylate, and/or silicone-containing functional groups and/or any other suitable polymerizable and/or cross-linkable functional group, without limitation. Curable material 42 may also include one or more other constituents, such as, for example, an initiator, a catalyst, a stabilizer, a hardener, an accelerator, a curative, a solid filler, and/or any other suitable additive.

Examples of suitable curable resin materials may include, without limitation, SPEEDMASK (Dymax Corporation, Torrington, Conn.) UV/visible light curable resin, EP62-1 (Master Bond Inc., Hackensack, N.J.) two component epoxy resin system, EP21ARHT (Master Bond Inc., Hackensack, N.J.) two component epoxy resin system, ARC 982 (ARC Composite Technology, Stoneham, Mass.) composite coating, ARC S4+(ARC Composite Technology, Stoneham, Mass.) composite coating, and/or ARC MX4 (ARC Composite Technology, Stoneham, Mass.) composite coating.

As illustrated in FIGS. 6 and 7, superabrasive element 10 may be inserted into protective leaching cup 30 so as to displace/contact at least a portion of curable material 42. For example, superabrasive element 10 may be inserted into protective leaching cup 30 so that a portion of superabrasive element 10, such as a portion of substrate 12, contacts and compresses curable material 42 against an inner surface portion of protective leaching cup 30, such as an inner rear surface 41 of rear wall 32 and/or inner side surface 40 of side wall 34. As curable material 42 is compressed between superabrasive element 10 and protective leaching cup 30, curable material 42 may be distributed between at least a portion of superabrasive element 10 and protective leaching cup 30. According to some embodiments, curable material 42 may be directed outward from central axis 29 (see FIG. 4), as represented by directional arrows 44A and 44B shown in FIG. 6.

As curable material 42 is further compressed between superabrasive element 10 and protective leaching cup 30, curable material 42 may be displaced such that at least a portion of curable material 42 is located between element side surface 15 of superabrasive element 10 and side wall 34 of protective leaching cup 30, and such that curable material 42 peripherally surrounds at least a portion of element side surface 15 of superabrasive element 10. For example, as shown in FIGS. 6 and 7, curable material 42 may surround at least a portion of substrate 12 of superabrasive element 10 within encapsulating region 39 of protective leaching cup 30. In some embodiments, as superabrasive element 10 is further inserted into protective leaching cup 30, curable material 42 may partially or substantially fill a gap 46 defined between element side surface 15 of superabrasive element 10 and inner side surface 40 of protective leaching cup 30. By at least partially filling gap 46, curable material 42 may push out gases occupying gap 46. Additionally, because curable material 42 flows through gap 46, thereby coming in contact with various surfaces of superabrasive element 10 and protective leaching cup 30, curable material 42 may cover or fill in imperfections, such as tears, pin holes, and/or other imperfections in leaching cup 30 and/or superabrasive element 10.

Figure 8:
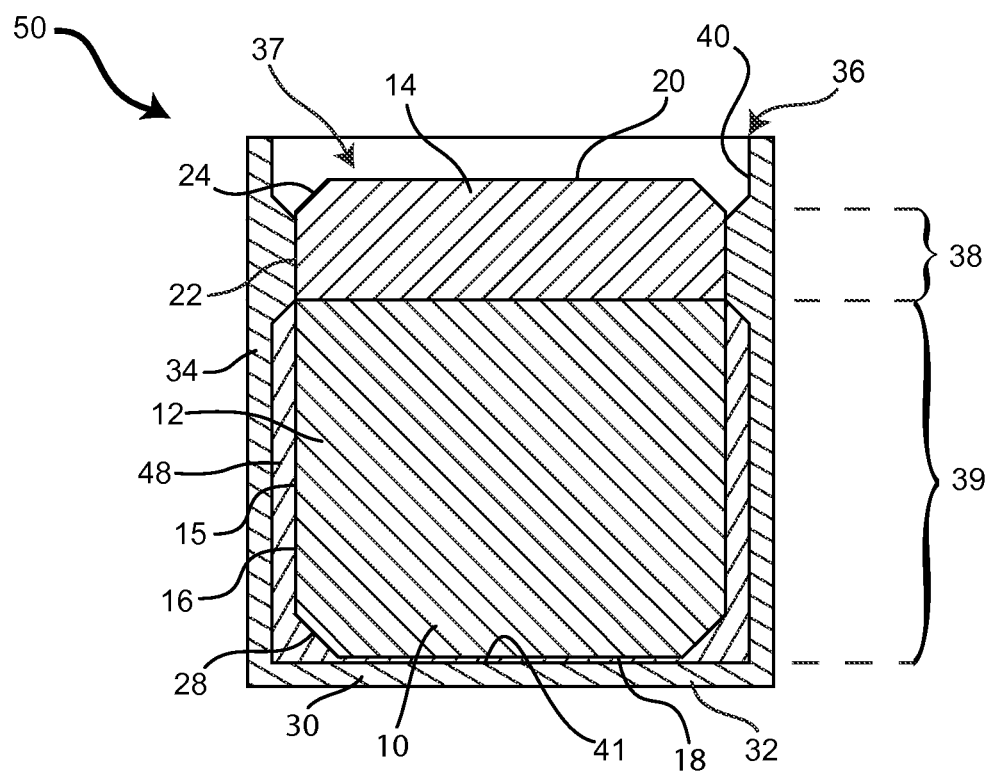
FIG. 8 is a cross-sectional side view of an exemplary leaching assembly comprising the exemplary protective leaching cup illustrated in FIG. 5.

FIG. 8 shows an exemplary leaching assembly 50 that includes superabrasive element 10 surrounded by protective layer 48 within protective leaching cup 30. As illustrated in FIG. 8, after superabrasive element 10 is positioned within protective leaching cup 30, curable material 42 may be cured to form a protective layer 48 that is partially or fully solidified. Curable material 42 may be cured to form protective layer 48 using any suitable curing technique, without limitation. For example, curable material 42 may comprise a UV curable resin. The leaching assembly may be exposed to UV light for a desired period of time in order to cure the curable material 42 to a desired state. According to some embodiments, protective leaching cup 30 may allow passage therethrough of at least a portion of UV light incident on protective leaching cup 30. Accordingly, curable material 42 may be cured while it is surrounded by protective leaching cup 30. In some embodiments, curable material 42 may be cured by exposure to UV wavelength light, visible light, and/or any other suitable electromagnetic wavelength.

In at least one embodiment, curable material 42 may be mixed with additives prior to, during, and/or following deposition of curable material 42 within protective leaching cup 30. In at least one embodiment, light-colored fillers may be included in curable material 42. Such light-colored fillers may be semi-transparent to certain wavelengths of light, including, for example, near-ultraviolet light. For example, curable material 42 may comprise an epoxy material that is mixed with a curative agent that initiates curing of curable material 42. In additional embodiments, curing of curable material 42 may be initiated and/or promoted by exposing curable material 42 to ultraviolet light, visible light, electromagnetic radiation, electron beam, heat, moisture, any other suitable curing agent, and/or any other suitable environmental condition, without limitation.

In some embodiments, various other hardenable and/or curable materials may be used in place of and/or in addition to curable material 42. For example, any suitable material having a viscous, semi-viscous, malleable, deformable, and/or moldable consistency may be disposed within protective leaching cup 30 and subsequently hardened within protective leaching cup 30; such materials used in place of and/or in addition to curable material 42 may include, for example, suitable metals, alloys, polymers, carbon allotropes, oxides, carbides, glass materials, ceramics, composites, and/or any combination of the foregoing, without limitation.

Curable material 42 may be cured to form protective layer 48 at any suitable time, including prior to, during, and/or following exposure of protective leaching cup 30 and superabrasive element 10 to a leaching agent. According to some embodiments, curable material 42 may be at least partially cured during a leaching process. For example, conditions of the leaching process environment may initiate and/or facilitate curing of curable material 42. The temperature and/or time of the leaching process may result in partial or full curing of curable material 42. According to at least one embodiment, protective leaching cup 30 and superabrasive element 10 may be exposed to a leaching solution that is heated to a temperature of between approximately 25° C. and approximately 280° C., which facilitates curing of curable material 42. According to additional embodiments, the leaching solution may be heated to a temperature of between approximately 60° C. and approximately 240° C. during leaching. Superabrasive element 10 and protective leaching cup 30 may be exposed to a leaching solution for any suitable period of time. In some embodiments, superabrasive element 10 and protective leaching cup 30 may be exposed to the leaching solution for a period of between 1 and 5 days, during which time curable material 42 may be partially or fully cured to form protective layer 48.

According to some embodiments, a protective layer 48 may be formed over at least a portion of superabrasive element 10 prior to loading superabrasive element 10 into protective leaching cup 30, as described in greater detail below with reference to FIGS. 12-15.

According to at least one embodiment, protective layer 48 may contact superabrasive element 10 and/or protective leaching cup 30. Additionally, protective layer 48 may be bonded to at least a portion of superabrasive element 10 and/or protective leaching cup 30. For example, protective layer 48 may be bonded to at least a portion of substrate 12 and/or superabrasive table 14, including, for example, at least a portion of substrate side surface 16, superabrasive face 20, superabrasive side surface 22, substrate chamfer 28, and/or rear surface 18. In some embodiments, protective layer 48 may be bonded to at least a portion of protective leaching cup 30, such as at least a portion of inner side surface 40 and/or inner rear surface 41. In various embodiments, protective layer 48 may not be bonded to protective leaching cup 30. For example, protective layer 48 may contact, but not be bonded to, at least a portion of inner side surface 40 and/or inner rear surface 41 of protective leaching cup 30.

When superabrasive element 10 is positioned within protective leaching cup 30, at least a portion of superabrasive element 10, such as superabrasive table 14 and/or substrate 12, may be positioned adjacent to and/or contacting a portion of protective leaching cup 30. For example, seal region 38 of protective leaching cup 30 may be configured to contact at least a portion of element side surface 15 of superabrasive element 10, forming a seal between protective leaching cup 30 and superabrasive element 10 that is partially or fully impermeable to various fluids, such as a leaching material (e.g., a leaching solution). As shown in FIG. 8, superabrasive element 10 may be positioned within protective leaching cup 30 so that seal region 38 of protective leaching cup 30 contacts and forms a seal with at least a portion of element side surface 15, such as at least a portion of superabrasive side surface 22 and/or at least a portion of substrate side surface 16. In some embodiments, at least a portion of seal region 38 of protective leaching cup 30 may have an inner diameter $ID_1$ that is equal to or less than (e.g., when unassembled with superabrasive element 10) an outer diameter $OD_1$ of superabrasive element 10 (e.g., inner diameter $ID_1$ and outer diameter $OD_1$ illustrated in FIGS. 2 and 4). Accordingly, at least a portion of side wall 34 in seal region 38 of protective leaching cup 30 may contact and/or form a seal with at least a portion of superabrasive element 10.

According to some embodiments, when assembled, at least a portion of encapsulating region 39 may have an inner diameter $ID_2$ that is greater than an outer diameter $OD_1$ of superabrasive element 10 (e.g., inner diameter $ID_2$ and outer diameter $OD_1$ illustrated in FIGS. 2 and 4). For example, when superabrasive element 10 is positioned within protective leaching cup 30, at least a portion of side wall 34 in encapsulating region 39 of protective leaching cup 30 may be spaced apart from superabrasive element 10 such that a gap 46 is defined between element side surface 15 of superabrasive element 10 and encapsulating region 39 of protective leaching cup 30, with gap 46 being at least partially occupied by protective layer 48. (see, e.g., gap 46 illustrated in FIG. 6).

In certain embodiments, prior to loading superabrasive element 10 into protective leaching cup 30, protective leaching cup 30 may be preheated to an elevated temperature. For example, protective leaching cup 30 may be heated to a softening point at which the material forming protective leaching cup 30 is suitably softened (e.g. temporarily reducing the leaching cup's elasticity). Heating protective leaching cup 30 to a suitable temperature may facilitate positioning of superabrasive element 10 within protective leaching cup 30. For example, heating protective leaching cup 30 to a suitable temperature may cause protective leaching cup 30 to expand and/or provide an enhanced ability to deform to ease the placement and positioning of superabrasive element 10 within protective leaching cup 30 and to prevent portions of protective leaching cup 30 from being damaged by superabrasive element 10 during loading. Heating protective leaching cup 30 may also enable a more secure or effective seal to be formed between protective leaching cup 30 and superabrasive element 10, thereby further inhibiting passage of a leaching agent between protective leaching cup 30 and superabrasive element 10. Protective leaching cup 30 may be heated to any temperature suitable for softening the material forming protective leaching cup 30 to a desired extent. In at least one embodiment, a protective leaching cup 30 comprising a polyethylene material, such as linear low-density polyethylene (LLDPE), may be heated to a temperature of between about 130° F. and about 180° F.

According to various embodiments disclosed herein, superabrasive element 10 may be processed prior to loading superabrasive element 10 into protective leaching cup 30 in order to provide a smoother surface on an exterior portion of superabrasive element 10. For example, exterior portions of superabrasive table 14 that come into contact with protective leaching cup 30, such as portions of element side surface 15 including superabrasive side surface 22 of superabrasive table 14 and/or substrate side surface 16 of substrate 12, may be processed to reduce surface imperfections. Superabrasive side surface 22 and/or substrate side surface 16 of superabrasive element 10 may be smoothed and/or polished using any suitable mechanical, chemical, and/or electrical processing technique to reduce surface imperfections or improve surface finish, without limitation. For example, superabrasive side surface 22 may be smoothed and/or polished by grinding, lapping, milling, polishing, and/or any other suitable mechanical processing technique. By way of example, U.S. Pat. Nos. 5,967,250; 6,145,608; 5,653,300; 5,447,208; and 5,944,129, the disclosure of each of which is incorporated herein, in its entirety, by this reference, disclose superabrasive elements having smoothed surface portions.

In at least one embodiment, a peripheral surface portion of superabrasive element 10, such as at least a portion of superabrasive side surface 22 and/or substrate side surface 16, may be mechanically smoothed and/or polished using a centerless grinder to a surface roughness of less than approximately 40 μin. In some embodiments, at least a portion of element side surface 15 of superabrasive element 10 may be smoothed to a measured surface roughness (e.g., mean roughness or root mean square roughness) of between approximately 10 μin and approximately 20 μin. In additional embodiments, at least a portion of element side surface 15 of superabrasive element 10 may be smoothed to a surface roughness of less than approximately 10 μin.

In certain embodiments, at least a portion of superabrasive side surface 22 and/or substrate side surface 16 may be chemically smoothed and/or polished by exposing superabrasive side surface 22 and/or substrate side surface 16 to a corrosive solution, such as a strongly acidic solution, that reduces surface imperfections on superabrasive side surface 22 and/or substrate side surface 16. In other embodiments, superabrasive side surface 22 and/or substrate side surface 16 may be plated electrolytically and/or using an electroless plating technique (e.g., chemical or auto-catalytic plating). In some embodiments, a portion of protective leaching cup 30, such as side wall 34 in seal region 38, may optionally be smoothed and/or polished using any suitable mechanical, chemical, and/or electrical processing technique.

Due to the improved smoothness of superabrasive side surface 22, substrate side surface 16, and/or at least a portion of protective leaching cup 30, a seal between superabrasive side surface 22 and/or substrate side surface 16 and a portion of protective leaching cup 30, such as side wall 34 in seal region 38, abutting superabrasive side surface 22 and/or substrate side surface 16 may be improved, thereby inhibiting passage of a leaching agent between superabrasive element 10 and protective leaching cup 30. Materials forming protective leaching cup 30 may also be selected and processed so as to improve a seal between at least a portion of superabrasive element 10 and protective leaching cup 30. By way of example, U.S. Patent Application Publication No. 2011/0056141 A1, the disclosure of which is incorporated herein, in its entirety, by this reference, discloses processes and materials for forming protective layers over superabrasive elements.

Subsequent to loading superabrasive element 10 into protective leaching cup 30 and prior to leaching, at least a portion of trapped gases, such as air and/or other gases, may be at least partially evacuated from between superabrasive element 10 and/or protective layer 48 and protective leaching cup 30. For example, portions of side wall 34 may be pushed outward away from superabrasive element 10 and protective layer 48 so as to facilitate evacuation of gases trapped within protective leaching cup 30, as will be described in greater detail below with reference to FIGS. 20 and 21.

By maintaining a seal between superabrasive element 10 and protective leaching cup 30 during leaching, portions of superabrasive element 10 may be prevented or inhibited from being exposed to a leaching agent during leaching, thereby preventing damage, such as corrosion damage, to certain regions of superabrasive element 10, such as substrate 12. Additionally, various regions of superabrasive element 10, such as superabrasive face 20 and/or superabrasive chamfer 24, may not be covered by protective leaching cup 30 and may remain exposed to a leaching agent during leaching, enabling leaching of such regions to achieve a desired leach depth configuration or profile.

Protective layer 48, which surrounds at least a portion of superabrasive element 10, including at least a portion of substrate 12, may additionally prevent a leaching agent from contacting substrate 12 during and/or following leaching. For example, pinholes, which may be formed in protective leaching cup 30 during ejection of superabrasive element 10 from a leaching apparatus following a leaching procedure, may allow a leaching agent to contact protective layer 48. A portion of protective layer 48 disposed between rear wall 32 of protective leaching cup 30 and rear surface 18 of superabrasive element 10, may inhibit or prevent a leaching agent, such as a leaching agent entering protective leaching cup 30 through rear wall 32, from contacting rear surface 18 of superabrasive element 10. A portion of protective layer 48 disposed between element side surface 15 of superabrasive element 10 and side wall 34 of protective leaching cup 30 may further prevent a leaching agent from contacting at least a portion of substrate side surface 16 of superabrasive element 10. Accordingly, protective layer 48 may further inhibit or prevent damage, such as corrosion damage, to various regions of superabrasive element 10, such as substrate 12, during and/or following leaching.

Following leaching of superabrasive element 10, the remaining protective leaching cup 30 and protective layer 48 may be removed from superabrasive element 10. In at least one embodiment, superabrasive element 10 may be mechanically ejected from protective leaching cup 30. Subsequently, protective layer 48 may be substantially removed from superabrasive table 14 and/or substrate 12 using any suitable technique, including, for example, lapping, grinding, and/or removal using suitable chemical agents. According to certain embodiments, protective layer 48 may be peeled, cut, ground, lapped, and/or otherwise physically or chemically removed from superabrasive element 10. In some embodiments, following or during removal of protective layer 48, one or more surfaces of superabrasive table 14 and/or substrate 12 may be processed to form a desired surface texture and/or finish using any suitable technique, including, for example, lapping, grinding, and/or otherwise physically and/or chemically treating the one or more surfaces.

According to at least one embodiment, prior to and/or during curing, a portion of curable material 42 may push between seal region 38 of protective leaching cup 30 and superabrasive element 10. For example, during loading of superabrasive element 10 into protective leaching cup 30, a portion of curable material 42 may be forced in between seal region 38 of protective leaching cup 30 and superabrasive element 10. In some embodiments, curable material 42 may expand during curing such that some of curable material 42 is forced between seal region 38 and superabrasive element 10. Curable material 42 may also flow above seal region 38 to an exposed portion of protective leaching cup 30. Subsequently, when curable material 42 is cured to form protective layer 48, a portion of protective layer 48 may remain disposed between seal region 38 and superabrasive element 10 and/or above seal region 38. Optionally, a portion of protective layer 48 disposed between seal region 38 and superabrasive element 10 and/or above seal region 38 may be removed using any suitable technique prior to leaching.

Figure 9A:
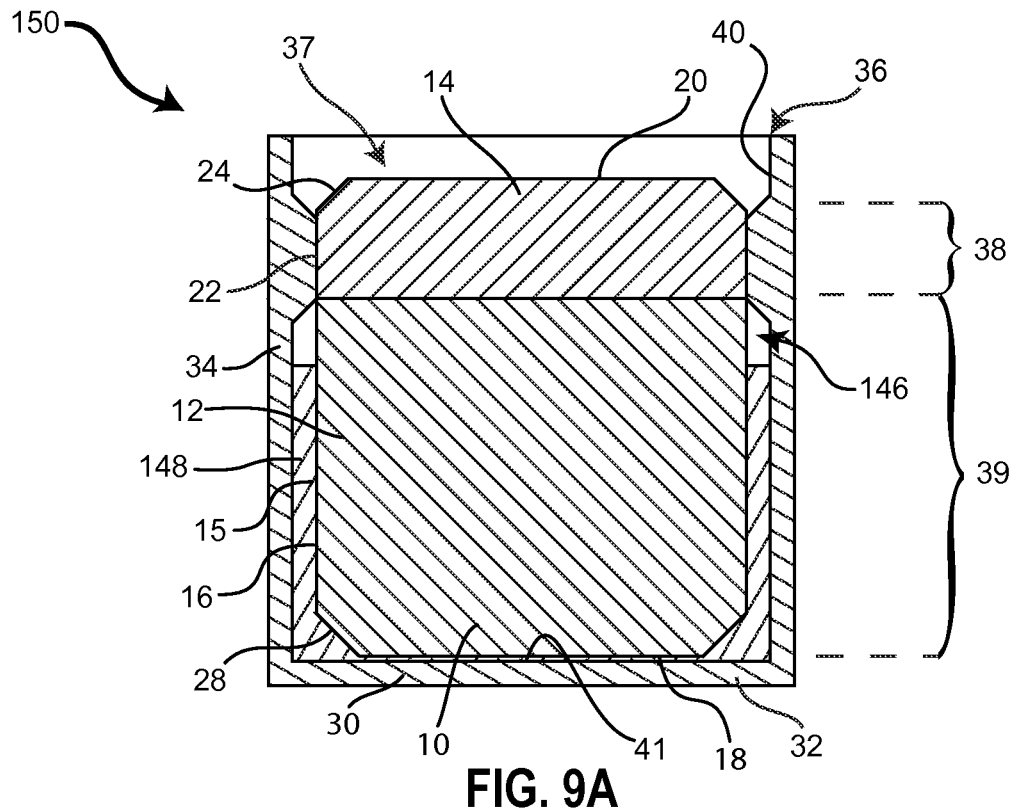
FIG. 9A is a cross-sectional side view of an exemplary leaching assembly according to at least one embodiment.
Figure 9B:
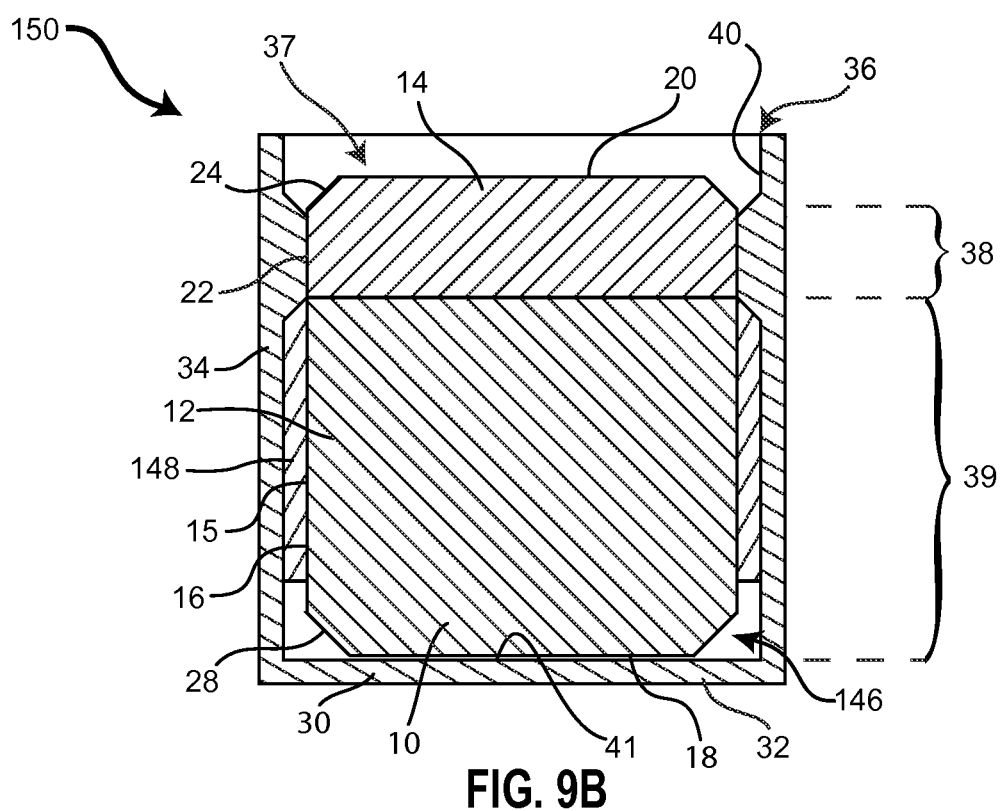
FIG. 9B is a cross-sectional side view of an exemplary leaching assembly according to at least one embodiment.

FIGS. 9A and 9B illustrate an exemplary leaching assembly 150 comprising a protective layer 148 that partially fills a space defined between element side surface 15 of superabrasive element 10 and encapsulating region 39 of protective leaching cup 30. Protective layer 148 may be formed by any suitable technique, including, for example, by curing a curable resin within protective leaching cup 30 (see, e.g., curable material 42 shown in FIGS. 5-7). As shown in FIG. 9A, a gap 146 may be defined between element side surface 15 of superabrasive element 10 and encapsulating region 39 of protective leaching cup 30 in a space where protective layer 148 is not formed.

As shown in FIG. 9B, a gap 146 may optionally be located adjacent rear wall 32 of protective leaching cup 30. Gap 146 may be defined between element side surface 15 of superabrasive element 10 and encapsulating region 39 of protective leaching cup 30 in a space where protective layer 148 is not formed. Protective layer 148 illustrated in FIG. 9B may be formed, for example, by partially filling a gap (e.g., gap 46 illustrated in FIG. 6) between superabrasive element 10 and protective leaching cup 30 with a curable material 42. Protective leaching cup 30 and superabrasive element 10 may then be turned upside down so that curable material 42 flows away from rear wall 32 and towards a portion of encapsulating region 39 adjacent to seal region 38. With curable material 42 being disposed adjacent to seal region 38, a gap 146 is defined between element side surface 15 of superabrasive element 10 and encapsulating region 39 of protective leaching cup 30 in a space where curable material 42 is not disposed. With protective leaching cup 30 and superabrasive element 10 positioned upside down, curable material 42 may be at least partially cured to form protective layer 148.

Figure 10:
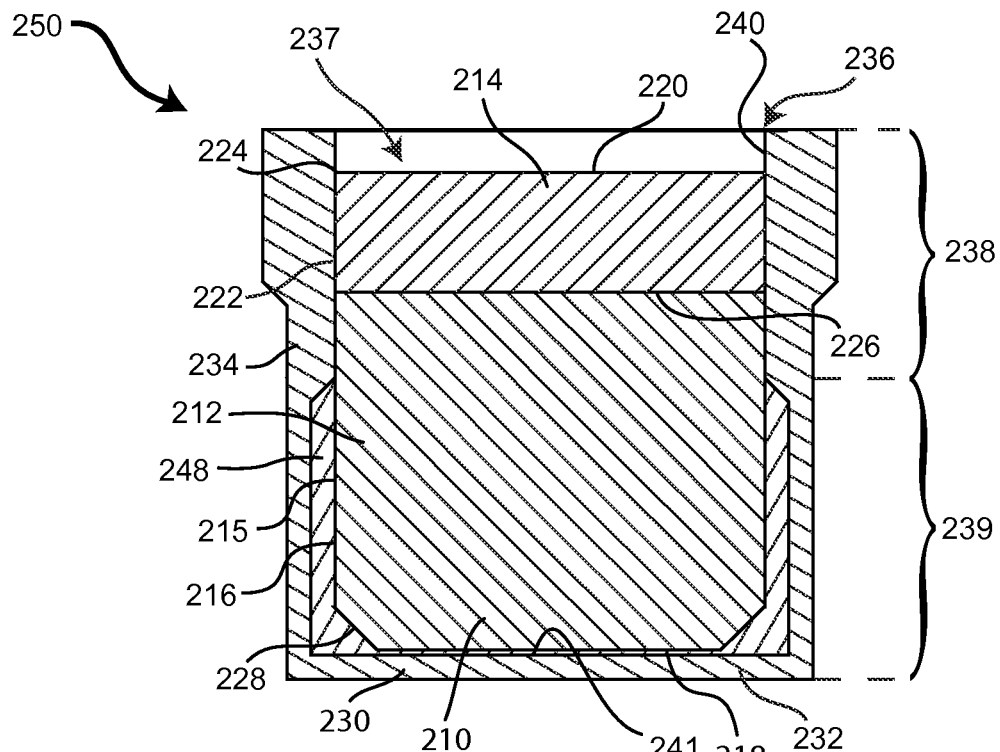
FIG. 10 is a cross-sectional side view of an exemplary leaching assembly according to at least one embodiment.
Figure 11:
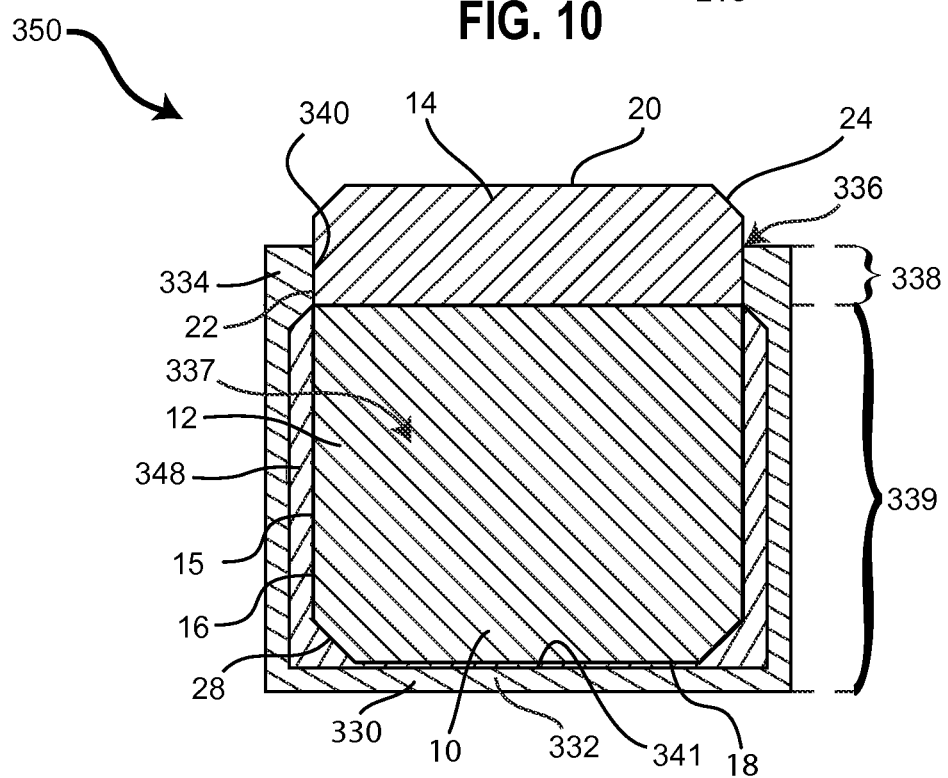
FIG. 11 is a cross-sectional side view of an exemplary leaching assembly according to at least one embodiment.
Figure 12:
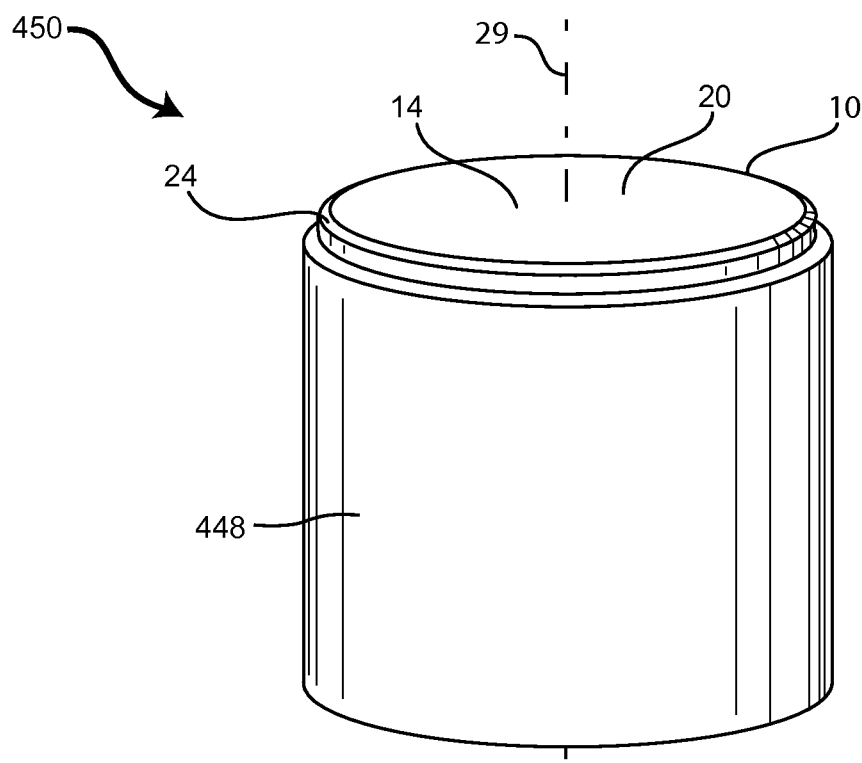
FIG. 12 is a perspective view of an exemplary leaching assembly according to at least one embodiment.

FIGS. 10-12 illustrate exemplary leaching assemblies according to various embodiments. FIG. 10 shows an exemplary leaching assembly 250 comprising superabrasive element 210, protective leaching cup 230, and protective layer 248 according to at least one embodiment. Protective layer 248 and protective leaching cup 230 may be utilized for processing superabrasive elements having various surface configurations formed at an intersection of a side surface and a rear surface.

As shown in FIG. 10, superabrasive element 210 may comprise a superabrasive table 214 affixed to or formed upon a substrate 212. Superabrasive table 214 may be affixed to substrate 212 at interface 226. Superabrasive element 210 may comprise a rear surface 218, a superabrasive face 220, and an element side surface 215. In some embodiments, element side surface 215 may include a substrate side surface 216 formed by substrate 212 and a superabrasive side surface 222 formed by superabrasive table 214. Rear surface 218 may be formed by substrate 212. Superabrasive element 210 may also comprise a superabrasive face 220 formed by superabrasive table 214.

According to at least one embodiment, superabrasive element 210 may comprise a superabrasive edge 224 formed by superabrasive table 214. In some embodiments, superabrasive edge 224 may comprise an angular and/or rounded edge or any other suitable surface shape, including, without limitation, an arcuate surface (e.g., a radius, an ovoid shape, or any other rounded shape), a sharp edge, a honed edge, and/or combinations of the foregoing, formed at the intersection of superabrasive side surface 222 and superabrasive face 220.

Protective leaching cup 230 may comprise a rear wall 232 and a side wall 234 defining a cavity 237 extending from opening 236. According to various embodiments, protective leaching cup 230 may comprise a seal region 238 and an encapsulating region 239. Seal region 238 may be adjacent opening 236 and encapsulating region 239 may extend from seal region 238 and may include rear wall 232. According to some embodiments, a portion of side wall 234 in seal region 238 may have a different diameter and/or shape than a portion of side wall 234 in encapsulating region 239. For example, a portion of side wall 234 in encapsulating region 239 may have an inner diameter that is greater than an inner diameter of a portion of side wall 234 in seal region 238.

Protective layer 248 may surround at least a portion of superabrasive element 210, including at least a portion of substrate 212 and/or at least a portion of superabrasive table 214. For example, as shown in FIG. 10, protective layer 248 may be formed adjacent to and/or abutting rear surface 218, substrate chamfer 228, and/or substrate side surface 216 of substrate 212. Protective layer 248 may be disposed between at least a portion of superabrasive element 210 and protective leaching cup 230, such as a region between substrate 212 and protective leaching cup 230 within encapsulating region 239.

Protective layer 248 may be formed of any suitable material. For example, protective layer 248 may comprise a cured or partially cured resin material. For example, protective layer 248 may comprise a material that is formed by curing a curable resin through exposure to chemical additives, light, electromagnetic radiation, ultraviolet radiation, electron beam radiation, heat, moisture, and/or any other suitable curing agent, without limitation. In some embodiments, protective layer 248 may comprise a protective resin material, such as a fluorine resin material, that is formed on at least a portion of superabrasive element 210 through evaporation of solvent components from a dissolved resin solution coating. Protective layer 248 may also comprise any other suitable protective material that is substantially inert and/or otherwise resistant to acids, bases, and/or other reactive compounds present in a leaching solution used to leach superabrasive element 210. For example, any suitable material having a viscous, semi-viscous, malleable, deformable, and/or moldable consistency may be used, including, for example, suitable metals, alloys, polymers, carbon allotropes, oxides, carbides, glass materials, ceramics, composites, and/or any combination of the foregoing, without limitation.

Protective layer 248 and/or a material used to form protective layer 248 may be applied to at least a portion of superabrasive element 210 by any suitable technique described herein, without limitation. Protective layer 248 may also comprise any suitable size, shape, geometry, and thickness surrounding at least a portion of superabrasive element 210, without limitation.

As shown in FIG. 10, superabrasive element 210 may be at least partially surrounded by protective layer 248, and superabrasive element 210 and protective layer 248 may both be positioned within protective leaching cup 230. For example, protective layer 248 may at least partially surround superabrasive element 210 so that at least a portion of rear surface 218 of superabrasive element 210 and/or at least a portion of side surface 215 of superabrasive element 210 are adjacent protective layer 248.

In some embodiments, superabrasive element 210 may be bonded or otherwise adhered to protective layer 248. In additional embodiments, superabrasive element 210 may be less tightly (e.g., removably) surrounded by protective layer 248, thereby facilitating removal of superabrasive element 210 from protective layer 248. In some embodiments, protective layer 248 may conform to at least a portion of element side surface 215, rear surface 218, and/or substrate chamfer 228. According to some embodiments, protective layer 248 may circumferentially surround and/or abut a peripheral portion of superabrasive element 210.

Superabrasive element 210 and protective layer 248 may be positioned within protective leaching cup 230 such that at least a portion of an outer periphery of superabrasive element 210 and at least a portion of an outer periphery of protective layer 248 are surrounded by protective leaching cup 230. According to some embodiments, superabrasive element 210 and protective layer 248 may be positioned within protective leaching cup 230 so that at least a portion of protective layer 248 is adjacent rear wall 232 and/or side wall 234 of protective leaching cup 230. Additionally, at least a portion of superabrasive element 210, such as superabrasive table 214 and/or substrate 212, may be positioned adjacent to and/or contacting a portion of protective leaching cup 230. For example, seal region 238 of protective leaching cup 230 may be configured to contact at least a portion of element side surface 215 of superabrasive element 210, forming a seal between protective leaching cup 230 and superabrasive element 210 that is partially or fully impermeable to various fluids, such as a leaching material (e.g., a leaching solution).

As shown in FIG. 10, superabrasive element 210 may be positioned within protective leaching cup 230 so that seal region 238 of protective leaching cup 230 contacts and forms a seal with at least a portion of element side surface 215, such as at least a portion of superabrasive side surface 222 and/or at least a portion of substrate side surface 216. In some embodiments, at least a portion of seal region 238 of protective leaching cup 230 may have an inner diameter that is equal to or less than (e.g., when unassembled with superabrasive element 210) an outer diameter of superabrasive element 210. Accordingly, at least a portion of side wall 234 in seal region 238 of protective leaching cup 230 may contact and/or form a seal with at least a portion of superabrasive element 210.

At least a portion of seal region 238 of protective leaching cup 230 which does not contact superabrasive element 210 may extend between a portion of superabrasive table 214, such as superabrasive edge 224, and opening 236 following loading of superabrasive element 210 into protective leaching cup 230. Seal region 238 of protective leaching cup 230 may be configured to contact a portion of superabrasive element 210 and maintain a seal between protective leaching cup 230 and superabrasive element 210 during and/or following exposure of at least a portion of superabrasive element 210 to a leaching agent. For example, seal region 238 may be configured to maintain contact with superabrasive side surface 222 of superabrasive table 214 in a circumstance where superabrasive element 210 migrates toward opening 236 (e.g., during a leaching process).

According to some embodiments, protective layer 248 may tightly surround and/or may be bonded or otherwise adhered to superabrasive element 210 such that superabrasive element 210 is prevented from moving toward opening 236 during leaching. For example, protective layer 248 may also be bonded or otherwise adhered to inner side surface 240 of protective leaching cup 230 such that superabrasive element 210 and protective layer 248 are secured within protective leaching cup 230 during leaching. In some embodiments, seal region 238 of protective leaching cup 230 may have an inner diameter (e.g., $ID_1$ illustrated in FIG. 4) that is narrower than an outer diameter of protective layer 248 with respect to a central axis (e.g., central axis 29 illustrated in FIG. 4). As such, superabrasive element 210 and protective layer 248 may be prevented from moving/displacing toward opening 236 during leaching by seal region 238 of protective leaching cup 230.

In certain embodiments, prior to loading superabrasive element 210 and/or a curable resin for forming protective layer 248 into protective leaching cup 230, protective leaching cup 230 may be preheated to an elevated temperature. For example, protective leaching cup 230 may be heated to a softening point at which the material forming protective leaching cup 230 is suitably softened so as to facilitate positioning of superabrasive element 210 within protective leaching cup 230. Protective leaching cup 230 may be heated to any temperature suitable for softening the material forming protective leaching cup 230 to a desired extent. In at least one embodiment, a protective leaching cup 230 comprising a polyethylene material, such as linear low-density polyethylene (LLDPE), may be heated to a temperature of between about 130° F. and about 180° F.

According to various embodiments disclosed herein, superabrasive element 210 may be processed prior to loading superabrasive element 210 into protective leaching cup 230 in order to provide a smoother surface on an exterior portion of superabrasive element 210. For example, exterior portions of superabrasive table 214 that come into contact with protective leaching cup 230, such as portions of element side surface 215 including superabrasive side surface 222 of superabrasive table 214 and/or substrate side surface 216 of substrate 212, may be processed to reduce surface imperfections. In some embodiments, a portion of protective leaching cup 230, such as side wall 234 in seal region 238, may optionally be smoothed and/or polished using any suitable mechanical, chemical, and/or electrical processing technique. Due to the improved smoothness of superabrasive side surface 222, substrate side surface 216 and/or at least a portion of protective leaching cup 230, a seal between superabrasive side surface 222 and/or substrate side surface 216 and a portion of protective leaching cup 230, such as side wall 234 in seal region 238, abutting superabrasive side surface 222 and/or substrate side surface 216 may be improved, thereby inhibiting passage of a leaching agent between superabrasive element 210 and protective leaching cup 230. Materials forming protective leaching cup 230 may also be selected and processed so as to improve a seal between at least a portion of superabrasive element 210 and protective leaching cup 230.

Subsequent to loading superabrasive element 210 into protective leaching cup 230 and prior to leaching, at least a portion of trapped gases, such as air and/or other gases, may be at least partially evacuated from between superabrasive element 210 and/or protective layer 248 and protective leaching cup 230. For example, portions of side wall 234 may be pushed outward away from superabrasive element 210 and protective layer 248 so as to facilitate evacuation of gases trapped within protective leaching cup 230, as will be described in greater detail below with reference to FIGS. 20 and 21.

By maintaining a seal between superabrasive element 210 and protective leaching cup 230 during leaching, portions of superabrasive element 210 may be prevented or inhibited from being exposed to a leaching agent during leaching, thereby preventing damage, such as corrosion damage, to certain regions of superabrasive element 210, such as substrate 212. Additionally, various regions of superabrasive element 210, such as superabrasive face 220 and/or superabrasive edge 224, may not be covered by protective leaching cup 230 and may remain exposed to a leaching agent during leaching, enabling leaching of such regions to achieve a desired leach depth configuration.

Protective layer 248, which surrounds at least a portion of superabrasive element 210, including at least a portion of substrate 212, may additionally prevent a leaching agent from contacting substrate 212 during and/or following leaching. For example, pinholes, which may be formed in protective leaching cup 230 during ejection of superabrasive element 210 from a leaching apparatus following a leaching procedure, may allow a leaching agent to protective layer 248. A portion of protective layer 248, which is disposed between rear wall 232 of protective leaching cup 230 and rear surface 218 of superabrasive element 210, may inhibit or prevent a leaching agent, such as a leaching agent entering protective leaching cup 230 through rear wall 232, from contacting rear surface 218 of superabrasive element 210. A portion of protective layer 248 disposed between side wall 234 of protective leaching cup 230 and substrate side surface 216 of superabrasive element 210 may further prevent a leaching agent from contacting at least a portion of substrate 212, such as substrate chamfer 228 and/or at least a portion of substrate side surface 216. Accordingly, protective layer 248 may further inhibit or prevent damage, such as corrosion damage, to various regions of superabrasive element 210, such as substrate 212, during and/or following leaching.

FIG. 11 shows an exemplary leaching assembly 350 comprising superabrasive element 10, protective leaching cup 330, and protective layer 348 according to various embodiments. Protective layer 348 and protective leaching cup 330 may be utilized for processing superabrasive elements having various surface configurations formed at an intersection of a side surface and a rear surface.

Protective leaching cup 330 may comprise a rear wall 332 and a side wall 334 defining a cavity 337 extending from opening 336. According to various embodiments, protective leaching cup 330 may comprise a seal region 338 and an encapsulating region 339. Seal region 338 may be adjacent opening 336 and encapsulating region 339 may extend from seal region 338 and may include rear wall 332. According to some embodiments, a portion of side wall 334 in seal region 338 may have a different diameter and/or shape than a portion of side wall 334 in encapsulating region 339. For example, a portion of side wall 334 in encapsulating region 339 may have an inner diameter that is greater than an inner diameter of a portion of side wall 334 in seal region 338.

Protective layer 348 may surround at least a portion of superabrasive element 10, including at least a portion of substrate 12 and/or at least a portion of superabrasive table 14. For example, as shown in FIG. 11, protective layer 348 may be formed adjacent to and/or abutting rear surface 18, substrate chamfer 28, and/or substrate side surface 16 of substrate 12. Protective layer 348 may be disposed between at least a portion of superabrasive element 210 and protective leaching cup 330, such as a region between substrate 12 and protective leaching cup 330 within encapsulating region 339.

Protective layer 348 may be formed of any suitable material. For example, protective layer 348 may comprise a cured or partially cured resin material. For example, protective layer 348 may comprise a material that is formed by curing a curable resin through exposure to chemical additives, light, electromagnetic radiation, ultraviolet radiation, electron beam radiation, heat, moisture, and/or any other suitable curing agent, without limitation. In some embodiments, protective layer 348 may comprise a protective resin material, such as a fluorine resin material, that is formed on at least a portion of superabrasive element 10 through evaporation of solvent components from a dissolved resin solution coating. Protective layer 348 may also comprise any other suitable protective material that is substantially inert and/or otherwise resistant to acids, bases, and/or other reactive compounds present in a leaching solution used to leach superabrasive element 10. For example, any suitable material having a viscous, semi-viscous, malleable, deformable, and/or moldable consistency may be used, including, for example, suitable metals, alloys, polymers, carbon allotropes, oxides, carbides, glass materials, ceramics, composites, and/or any combination of the foregoing, without limitation.

Protective layer 348 and/or a material used to form protective layer 348 may be applied to at least a portion of superabrasive element 10 by any suitable technique described herein, without limitation. Protective layer 348 may also comprise any suitable size, shape, geometry, and thickness surrounding at least a portion of superabrasive element 10, without limitation.

As shown in FIG. 11, superabrasive element 10 may be at least partially surrounded by protective layer 348, and superabrasive element 10 and protective layer 348 may both be positioned within protective leaching cup 330. For example, protective layer 348 may at least partially surround superabrasive element 10 so that at least a portion of rear surface 18 of superabrasive element 10 and/or at least a portion of side surface 15 of superabrasive element 10 are adjacent protective layer 348.

In some embodiments, superabrasive element 10 may be bonded or otherwise adhered to protective layer 348. In additional embodiments, superabrasive element 10 may be less tightly (e.g., removably) surrounded by protective layer 348, thereby facilitating removal of superabrasive element 10 from protective layer 348. In some embodiments, protective layer 348 may conform to at least a portion of element side surface 15, rear surface 18, and/or substrate chamfer 28. According to some embodiments, protective layer 348 may circumferentially surround and/or abut a peripheral portion of superabrasive element 10.

Superabrasive element 10 and protective layer 348 may be positioned within protective leaching cup 330 such that at least a portion of an outer periphery of superabrasive element 10 and at least a portion of an outer periphery of protective layer 348 are surrounded by protective leaching cup 330. According to some embodiments, superabrasive element 10 and protective layer 348 may be positioned within protective leaching cup 330 so that at least a portion of protective layer 348 is adjacent rear wall 332 and/or side wall 334 of protective leaching cup 330. Additionally, at least a portion of superabrasive element 10, such as superabrasive table 14 and/or substrate 12, may be positioned adjacent to and/or contacting a portion of protective leaching cup 330. For example, seal region 338 of protective leaching cup 330 may be configured to contact at least a portion of element side surface 315 of superabrasive element 10, forming a seal between protective leaching cup 330 and superabrasive element 10 that is partially or fully impermeable to various fluids, such as a leaching material (e.g., a leaching solution).

As shown in FIG. 11, superabrasive element 10 may be positioned within protective leaching cup 330 so that seal region 338 of protective leaching cup 330 contacts and forms a seal with at least a portion of element side surface 15, such as at least a portion of superabrasive side surface 22 and/or at least a portion of substrate side surface 16. In some embodiments, at least a portion of seal region 338 of protective leaching cup 330 may have an inner diameter that is equal to or less than (e.g., when unassembled with superabrasive element 10) an outer diameter of superabrasive element 10. Accordingly, at least a portion of side wall 334 in seal region 338 of protective leaching cup 330 may contact and/or form a seal with at least a portion of superabrasive element 10.

Seal region 338 of protective leaching cup 330 may be configured to contact a portion of superabrasive element 10 and maintain a seal between protective leaching cup 330 and superabrasive element 10 during and/or following exposure of at least a portion of superabrasive element 10 to a leaching agent. For example, seal region 338 is configured to maintain contact with superabrasive side surface 22 of superabrasive table 14 in a situation where superabrasive element 10 migrates toward opening 336 (e.g., during a leaching process).

In certain embodiments, prior to loading superabrasive element 10 and/or a curable resin for forming protective layer 348 into protective leaching cup 330, protective leaching cup 330 may be preheated to an elevated temperature. For example, protective leaching cup 330 may be heated to a softening point at which the material forming protective leaching cup 330 is suitably softened so as to facilitate positioning of superabrasive element 10 within protective leaching cup 330. Protective leaching cup 330 may be heated to any temperature suitable for softening the material forming protective leaching cup 330 to a desired extent. In at least one embodiment, a protective leaching cup 330 comprising a polyethylene material, such as linear low-density polyethylene (LLDPE), may be heated to a temperature of between about 130° F. and about 180° F.

According to various embodiments disclosed herein, superabrasive element 10 may be processed prior to loading superabrasive element 10 into protective leaching cup 330 in order to provide a smoother surface on an exterior portion of superabrasive element 10. For example, exterior portions of superabrasive table 14 that come into contact with protective leaching cup 330, such as portions of element side surface 15 including superabrasive side surface 22 of superabrasive table 14 and/or substrate side surface 16 of substrate 12, may be processed to reduce surface imperfections. In some embodiments, a portion of protective leaching cup 330, such as side wall 334 in seal region 338, may optionally be smoothed and/or polished using any suitable mechanical, chemical, and/or electrical processing technique. Due to the improved smoothness of superabrasive side surface 22, substrate side surface 16 and/or at least a portion of protective leaching cup 330, a seal between superabrasive side surface 22 and/or substrate side surface 16 and a portion of protective leaching cup 330, such as side wall 334 in seal region 338, abutting superabrasive side surface 22 and/or substrate side surface 16 may be improved, thereby inhibiting passage of a leaching agent between superabrasive element 10 and protective leaching cup 330. Materials forming protective leaching cup 330 may also be selected and processed so as to improve a seal between at least a portion of superabrasive element 10 and protective leaching cup 330.

Subsequent to loading superabrasive element 10 into protective leaching cup 330 and prior to leaching, at least a portion of trapped gases, such as air and/or other gases, may be at least partially evacuated from between superabrasive element 10 and/or protective layer 348 and protective leaching cup 330. For example, portions of side wall 334 may be pushed outward away from superabrasive element 10 and protective layer 348 so as to facilitate evacuation of gases trapped within protective leaching cup 330, as will be described in greater detail below with reference to FIGS. 20 and 21.

By maintaining a seal between superabrasive element 10 and protective leaching cup 330 during leaching, portions of superabrasive element 10 may be prevented or inhibited from being exposed to a leaching agent during leaching, thereby preventing damage, such as corrosion damage, to certain regions of superabrasive element 10, such as substrate 12. Additionally, various regions of superabrasive element 10, such as superabrasive face 20, superabrasive chamfer 24, and/or superabrasive side surface 22 may not be covered by protective leaching cup 330 and may remain exposed to a leaching agent during leaching, enabling leaching of such regions to achieve a desired leach depth configuration.

Additionally, various regions of superabrasive element 10, such as superabrasive face 20, superabrasive chamfer 24, and/or at least a portion of superabrasive side surface 22 may not be covered by protective leaching cup 330 and may remain exposed to a leaching agent during leaching, enabling leaching of such regions to achieve a desired leach depth configuration. According to some embodiments, as illustrated in FIG. 11, at least a portion of superabrasive side surface 22 extending between seal region 338 of protective leaching cup 330 and superabrasive chamfer 24 of superabrasive element 10 may be exposed to a leaching agent during leaching.

Protective layer 348, which surrounds at least a portion of superabrasive element 10, including at least a portion of substrate 12, may additionally prevent a leaching agent from contacting substrate 12 during and/or following leaching. For example, pinholes, which may be formed in protective leaching cup 330 during ejection of superabrasive element 10 from a leaching apparatus following a leaching procedure, may allow a leaching agent to protective layer 348. A portion of protective layer 348, which is disposed between rear wall 332 of protective leaching cup 330 and rear surface 18 of superabrasive element 10, may inhibit or prevent a leaching agent, such as a leaching agent entering protective leaching cup 330 through rear wall 332, from contacting rear surface 18 of superabrasive element 10. A portion of protective layer 348 disposed between side wall 334 of protective leaching cup 330 and substrate side surface 16 of superabrasive element 10 may further prevent a leaching agent from contacting at least a portion of substrate 12, such as substrate chamfer 28 and/or at least a portion of substrate side surface 16. Accordingly, protective layer 348 may further inhibit or prevent damage, such as corrosion damage, to various regions of superabrasive element 10, such as substrate 12, during and/or following leaching.

Figure 13:
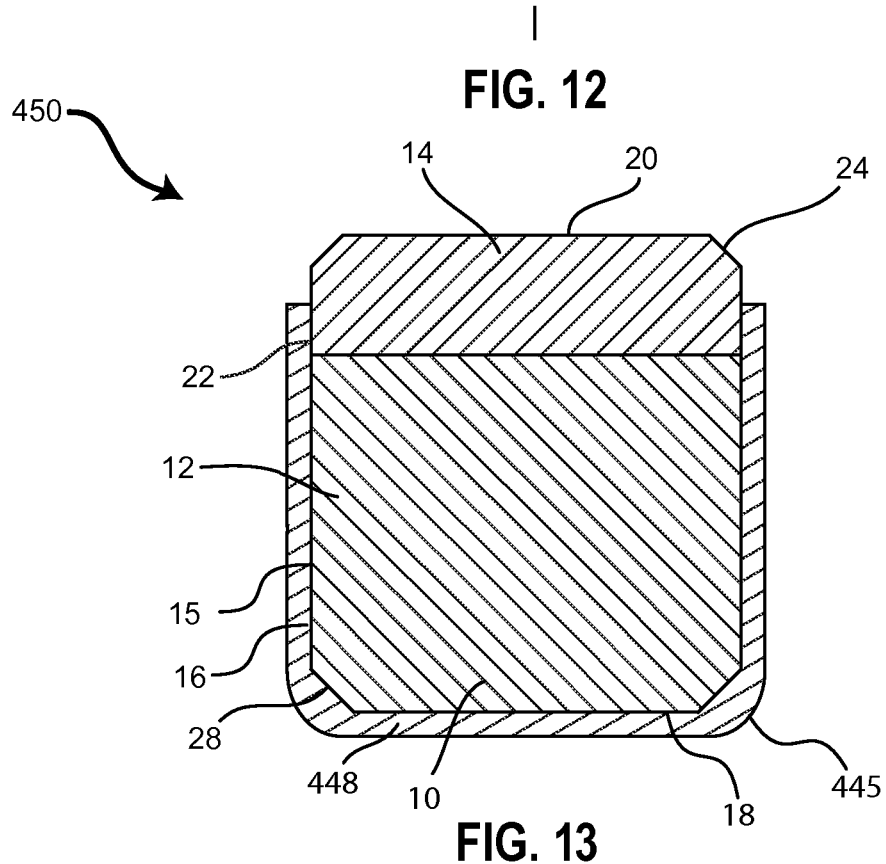
FIG. 13 is a cross-sectional side view of the exemplary leaching assembly illustrated in FIG. 12.

FIGS. 12 and 13 illustrate an exemplary leaching assembly 450 comprising a protective layer 448 that at least partially surrounds superabrasive element 10 according to at least one embodiment. As shown in FIGS. 12 and 13, protective layer 448 may be formed over at least a portion of superabrasive element 10, including substrate 12. Protective layer 448 may comprise a rounded edge portion 445 formed adjacent to an intersection of element side surface 15 and rear surface 18 of superabrasive element 10. Rounded edge portion 445 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Protective layer 448 may be formed to any suitable shape and thickness, without limitation.

Protective layer 448 may prevent damage to superabrasive element 10 when superabrasive element 10 is exposed to various reactive agents. For example, protective layer 448 may prevent a leaching solution from chemically damaging certain portions of superabrasive element 10, such as portions of substrate 12, portions of superabrasive table 14, or both, during leaching. In various examples, protective layer 448 may comprise one or more materials that are substantially inert and/or otherwise resistant to acids, bases, and/or other reactive compounds present in a leaching solution used to leach superabrasive element 10. In some embodiments, protective layer 448 may comprise one or more materials exhibiting significant stability at various temperatures and/or pressures, including elevated temperatures and/or pressures used in leaching and/or otherwise processing superabrasive element 10.

A material used to form protective layer 448 may comprise any suitable material or combination of materials, such as, for example, a curable resin compound. In at least one embodiment, a material used to form protective layer 448 may comprise a resin, gel, elastomer, and/or solution that includes one or more monomeric, oligomeric, and/or polymeric constituents that at least partially polymerize and/or at least partially cross-link to form a hardened polymeric material during a hardening, curing, and/or vulcanization process. Such a material may, for example, include any suitable resin material that is curable by exposure to chemical additives, light, electromagnetic radiation, ultraviolet radiation, electron beam radiation, heat, and/or moisture, without limitation. The material used to form protective layer 448 may comprise one or more polymerizable and/or cross-linkable components including, for example, monomeric, oligomeric, and/or polymeric molecules having one or more epoxide, ester, acryloyl, cyanate, isocyanate, and/or silicone-containing functional groups and/or any other suitable polymerizable and/or cross-linkable functional group, without limitation. The material used to form protective layer 448 may also include one or more other constituents, such as, for example, an initiator, a catalyst, a stabilizer, a hardener, an accelerator, a curative, and/or any other suitable additive.

Examples of suitable curable resin materials may include, without limitation, SPEEDMASK (Dymax Corporation, Torrington, Conn.) UV/visible light curable resin, EP62-1 (Master Bond Inc., Hackensack, N.J.) two component epoxy resin system, EP21ARHT (Master Bond Inc., Hackensack, N.J.) two component epoxy resin system, ARC 982 (ARC Composite Technology, Stoneham, Mass.) composite coating, ARC S4+(ARC Composite Technology, Stoneham, Mass.) composite coating, and/or ARC MX4 (ARC Composite Technology, Stoneham, Mass.) composite coating.

A curable material surrounding superabrasive elements 10 may be cured to form a protective layer 448 that is at least partially or fully solidified. For example, a curable resin may be cured to form protective layer 448 using any suitable curing technique, without limitation. For example, a curable material may comprise a UV curable resin that is exposed to UV light for a desired time in order to cure the material to a desired state. In at least one embodiment, a curable material may be mixed with additives prior to, during, and/or following coating of the curable material onto superabrasive element 10. For example, a curable material may comprise an epoxy material that is mixed with a curative that initiates curing of the curable material to form protective layer 448. In additional embodiments, curing of a curable material to form protective layer 448 may be initiated and/or promoted by exposing the curable material to light, electromagnetic radiation, electron beam, heat, moisture, any other suitable curing agent, and/or any other suitable environmental condition, without limitation.

In some embodiments, various other hardenable and/or curable materials may be used in place of and/or in addition to a curable material in order to form protective layer 448. For example, any suitable material having a viscous, semi-viscous, malleable, deformable, and/or moldable consistency may be used, including, for example, suitable metals, alloys, polymers, carbon allotropes, oxides, carbides, glass materials, ceramics, composites, and/or any combination of the foregoing, without limitation. Protective layer 448 may be applied to surface portions of superabrasive element 10 using any suitable technique, without limitation. For example, protective layer 448 may be applied to superabrasive element 10 by spraying, dipping, painting, casting, molding, and/or any other suitable coating technique, without limitation. Additionally, protective layer 448 may be applied to superabrasive element 10 using any suitable thin-film deposition technique, including, for example, any suitable type of chemical vapor deposition and/or physical vapor deposition technique, without limitation.

In at least one embodiment, protective layer 448 may comprise a fluorine resin coating having substantial resistance to acids, bases, and/or other reactive compounds present in a leaching solution used to leach superabrasive element 10. A fluorine resin coating may be formed on superabrasive element 10 in any suitable manner. According to at least one embodiment, a protective layer 448 comprising a fluorine resin coating may be formed on superabrasive element 10 by depositing a coating solution comprising a fluorine resin coating agent dissolved in a solvent onto exterior portions of superabrasive element 10. The coating may then be dried to evaporate solvent components of the solution to form protective layer 448. Examples of a solution comprising a dissolved fluorine resin coating agent include, without limitation, DURASURF DS-3300 (Harves Co., Ltd., Hong Kong, China) fluororesin film series coatings.

According to at least one embodiment, protective layer 448 may contact superabrasive element 10. Additionally, protective layer 448 may be bonded to at least a portion of superabrasive element 10. For example, protective layer 448 may be bonded to at least a portion of substrate 12 and/or superabrasive table 14, including, for example, at least a portion of substrate side surface 16, superabrasive side surface 22, and/or rear surface 18. At least a portion of protective layer 448 may be affixed to surface portions of substrate 12 and/or superabrasive table 14 such that a leaching agent is prevented or inhibited from passing between protective layer 448 and superabrasive element 10. Protective layer 448 may be formed over at least a portion of substrate 12 and/or superabrasive table 14 of superabrasive element 10 through any suitable mechanism, without limitation. In at least one example, protective layer 448 may be bonded to an exterior portion of superabrasive element 10 through ionic bonds, covalent bonds, and/or various intermolecular bonds. In some embodiments, protective layer 448 may be affixed to superabrasive element 10 through mechanical and/or frictional attachment of protective layer 448 to superabrasive element 10.

Protective layer 448 may be selectively formed over or applied to portions of substrate 12 and/or superabrasive table 14 in any pattern, design, or as otherwise desired, without limitation. According to some embodiments, protective layer 448 may be formed over a selected portion of superabrasive element 10 such that at least a portion of superabrasive element 10 is exposed. For example, protective layer 448 may be affixed to a selected portion of superabrasive element 10 that includes at least a portion of substrate 12 and/or superabrasive table 14. As illustrated in FIG. 13, protective layer 448 may be formed over a selected portion of superabrasive element 10 that includes rear face 18 and substrate side surface 16 of substrate 12, thereby inhibiting or preventing undesired corrosion of substrate 12 during leaching. As further shown in FIG. 13, the selected portion may also include a portion of superabrasive side surface 22 of superabrasive table 14, further inhibiting or preventing a leaching solution from contacting substrate 12 and/or a portion of superabrasive table 14 adjacent to substrate 12. An exposed surface region of superabrasive element 10 that is not covered by protective layer 448 may include at least a portion of superabrasive table 14, optionally including at least a portion of superabrasive side surface 22 and superabrasive face 20, as illustrated in FIG. 13.

According to some embodiments, protective layer 448 may be formed over superabrasive table 14 such that protective layer 448 is not formed on portions of superabrasive table 14 that are configured to be used as cutting surfaces and/or cutting edges (e.g., cutting surface and/or cutting edges of a cutting element). In at least one embodiment, protective layer 448 may be formed on or applied to superabrasive table 14 in an alternating pattern such that alternating leached and unleached regions may be formed on superabrasive table 14. Forming protective layer 448 over superabrasive element 10 in such configurations may enable selective optimization of various characteristics of superabrasive element 10 through selective leaching of superabrasive table 14.

Following formation of protective layer 448 over at least a portion of superabrasive element 10, leaching assembly 450 may be exposed to a leaching agent (e.g., a leaching solution and/or gas mixture). During leaching, a region of superabrasive element 10 that is not covered by protective layer 448 (i.e., an exposed surface region) may be exposed to a leaching solution during leaching. Additionally, the leaching solution may be inhibited or prevented from contacting a region which is covered by protective layer 448. Accordingly, the leaching solution may be inhibited or prevented from dissolving and/or corroding portions of superabrasive element 10 at and/or adjacent to a selected portion on which protective layer 448 is formed. The leaching solution may also be inhibited or prevented from penetrating between superabrasive element 10 and protective layer 448, further protecting portions of superabrasive element 10 at and/or adjacent to the selected portion.

According to various embodiments, edges of protective layer 448 may be securely affixed to superabrasive element 10, thereby preventing the edges from separating from superabrasive element 10 under various conditions, such as conditions existing during leaching and/or HPHT sintering. In order to securely fix edges of protective layer 448 to superabrasive element 10, protective layer 448 may comprise a material that is capable of strongly affixing to superabrasive table 14 and/or substrate 12 under various conditions. In some embodiments, protective layer 448 may also comprise a material that is capable of substantially maintaining its shape and/or configuration during leaching of superabrasive element 10. For example, protective layer 448 may comprise a material that is substantially resistant to various compounds present in a leaching solution. Protective layer 448 may also comprise a material that is substantially resistant to expansion and/or shrinkage under conditions present during leaching of superabrasive element 10. Such materials may include one or more of the above-described materials suitable for use in protective layer 448, without limitation.

Figure 14:
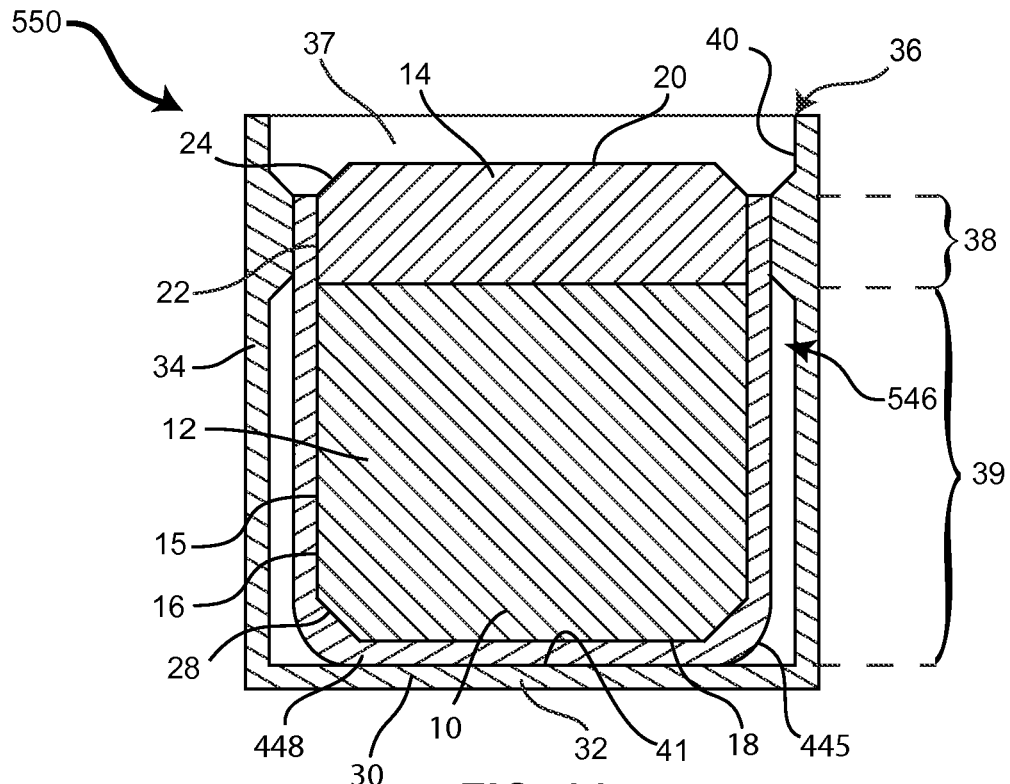
FIG. 14 is a cross-sectional side view of an exemplary leaching assembly according to at least one embodiment.
Figure 15:
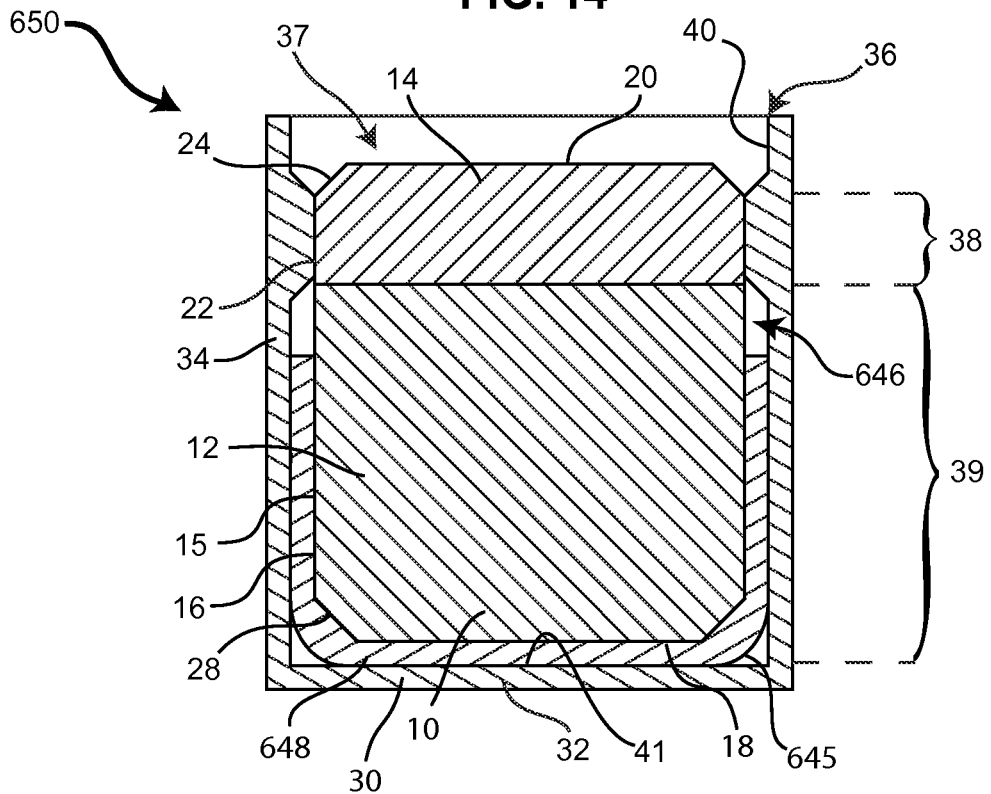
FIG. 15 is a cross-sectional side view of an exemplary leaching assembly according to at least one embodiment.

In some embodiments, a superabrasive element 10 coated with a protective layer 448 may be disposed within a leaching cup 30, as shown in FIGS. 14 and 15. As illustrated in FIG. 14, a leaching assembly 550 may comprise a leaching cup 30 surrounding superabrasive element 10 and protective layer 448. According to at least one embodiment, protective layer 448 may be formed on superabrasive element 10 prior to loading superabrasive element 10 into leaching cup 30. For example, a coating may be applied to superabrasive element 10 and subsequently cured and/or otherwise hardened according to any of the above-described techniques.

As shown in FIG. 14, when superabrasive element 10 is positioned within protective leaching cup 30, at least a portion of protective layer 448 may be positioned adjacent to and/or contacting a portion of protective leaching cup 30. For example, seal region 38 of protective leaching cup 30 may be configured to contact at least a portion of protective layer 448 adjacent element side surface 15 of superabrasive element 10, forming a seal between protective leaching cup 30 and protective layer 448 that is partially or fully impermeable to various fluids, such as a leaching material (e.g., a leaching solution). In some embodiments, at least a portion of seal region 38 of protective leaching cup 30 may have an inner diameter that is equal to or less than (e.g., when unassembled with superabrasive element 10 and protective layer 448) an outer diameter of protective layer 448 surrounding superabrasive element 10. Accordingly, at least a portion of side wall 34 in seal region 38 of protective leaching cup 30 may contact and/or form a seal with at least a portion of protective layer 448.

Rounded edge portion 445 of protective layer 448 may facilitate loading of superabrasive element 10 and protective layer 448 into protective leaching cup 30. Moreover, rounded edge portion 445 of protective layer 448 may prevent tearing or otherwise damaging protective leaching cup 30 (e.g., seal region 38) during loading. For example, rounded edge portion 445 of protective layer 448 may comprise a more rounded and/or gently curving surface in comparison with an edge or chamfer formed at the intersection of element side surface 15 and rear surface 18 of superabrasive element 10, thereby reducing a potential for tearing and/or damaging protective leaching cup 30 (e.g., seal region 38) during loading. Additionally, in some embodiments, rounded edge portion 445 may be formed of a material that presents a lower potential for tearing and/or damaging protective leaching cup 30 during loading in comparison with a material, for example cobalt-cemented tungsten carbide, forming substrate 12 of superabrasive element 10.

According to some embodiments, when assembled, at least a portion of encapsulating region 39 may have an inner diameter that is greater than an outer diameter of protective layer 448 surrounding superabrasive element 10. For example, when superabrasive element 10 and protective layer 448 are positioned within protective leaching cup 30, at least a portion of side wall 34 in encapsulating region 39 of protective leaching cup 30 may be spaced apart from protective layer 448 such that a gap 546 is defined between protective layer 448 and encapsulating region 39 of protective leaching cup 30.

In certain embodiments, prior to loading superabrasive element 10 and protective layer 448 into protective leaching cup 30, protective leaching cup 30 may be preheated to an elevated temperature. For example, protective leaching cup 30 may be heated to a softening point at which the material forming protective leaching cup 30 is suitably softened. Heating protective leaching cup 30 to a suitable temperature may facilitate positioning of superabrasive element 10 and protective layer 448 within protective leaching cup 30. For example, heating protective leaching cup 30 to a suitable temperature may cause protective leaching cup 30 to expand and/or provide an enhanced ability to deform to ease the placement and positioning of superabrasive element 10 within protective leaching cup 30 and to prevent portions of protective leaching cup 30 from being damaged by protective layer 448 during loading. Heating protective leaching cup 30 may also enable a more secure or effective seal to be formed between protective leaching cup 30 and protective layer 448, thereby further inhibiting passage of a leaching agent between protective leaching cup 30 and protective layer 448. Protective leaching cup 30 may be heated to any temperature suitable for softening the material forming protective leaching cup 30 to a desired extent. In at least one embodiment, a protective leaching cup 30 comprising a polyethylene material, such as linear low-density polyethylene (LLDPE), may be heated for a time sufficient for protective leaching cup 30 to reach a temperature of between about 130° F. and about 180° F.

According to various embodiments disclosed herein, protective layer 448 may be processed prior to loading superabrasive element 10 and protective layer 448 into protective leaching cup 30 in order to provide a smoother surface on an exterior portion of protective layer 448. For example, exterior portions of protective layer 448 that come into contact with protective leaching cup 30 may be processed to reduce surface imperfections. Protective layer 448 may be smoothed and/or polished using any suitable mechanical, chemical, and/or electrical processing technique to reduce surface imperfections or improve surface finish, without limitation. Due to the improved smoothness of protective layer 448 and/or at least a portion of protective leaching cup 30, a seal between protective layer 448 and a portion of protective leaching cup 30, such as side wall 34 in seal region 38, abutting protective layer 448 may be improved, thereby inhibiting passage of a leaching agent between protective layer 448 and protective leaching cup 30. Materials forming protective leaching cup 30 may also be selected and processed so as to improve a seal between at least a portion of protective layer 448 and protective leaching cup 30.

Subsequent to loading superabrasive element 10 and protective layer 448 and into protective leaching cup 30 and prior to leaching, at least a portion of trapped gases, such as air and/or other gases, may be at least partially evacuated from between superabrasive element 10 and/or protective layer 448 and protective leaching cup 30. For example, portions of side wall 34 may be pushed outward away from superabrasive element 10 and protective layer 448 so as to facilitate evacuation of gases trapped within protective leaching cup 30, as will be described in greater detail below with reference to FIGS. 20 and 21.

By maintaining a seal between superabrasive element 10 and protective layer 448 during leaching, portions of superabrasive element 10 may be prevented or inhibited from being exposed to a leaching agent during leaching, thereby preventing damage, such as corrosion damage, to certain regions of superabrasive element 10, such as substrate 12. Additionally, various regions of superabrasive element 10, such as superabrasive face 20 and/or superabrasive chamfer 24, may not be covered by protective leaching cup 30 and may remain exposed to a leaching agent during leaching, enabling leaching of such regions to achieve a desired leach depth/shape configuration.

Protective layer 448, which surrounds at least a portion of superabrasive element 10, including at least a portion of substrate 12, may additionally prevent a leaching agent from contacting substrate 12 during and/or following leaching. For example, pinholes, which may be formed in protective leaching cup 30 during ejection of superabrasive element 10 from a leaching apparatus following a leaching procedure, may allow a leaching agent to contact protective layer 448. A portion of protective layer 448 disposed between rear wall 32 of protective leaching cup 30 and rear surface 18 of superabrasive element 10, may inhibit or prevent a leaching agent, such as a leaching agent entering protective leaching cup 30 through rear wall 32, from contacting rear surface 18 of superabrasive element 10. A portion of protective layer 448 disposed between element side surface 15 of superabrasive element 10 and side wall 34 of protective leaching cup 30 may further prevent a leaching agent from contacting at least a portion of substrate side surface 16 of superabrasive element 10. Accordingly, protective layer 448 may further inhibit or prevent damage, such as corrosion damage, to various regions of superabrasive element 10, such as substrate 12, during and/or following leaching.

As illustrated in FIG. 15, a leaching assembly 650 may comprise a leaching cup 30 surrounding superabrasive element 10 and protective layer 648. According to at least one embodiment, protective layer 648 may be formed on superabrasive element 10 prior to loading superabrasive element 10 into leaching cup 30. For example, a coating may be applied to superabrasive element 10 and subsequently cured and/or otherwise hardened to form protective layer 648 according to any of the above-described techniques. Protective layer 648 may comprise a rounded edge portion 645 formed adjacent to an intersection of element side surface 15 and rear surface 18 of superabrasive element 10. Rounded edge portion 645 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Protective layer 648 may be formed to any suitable shape and thickness, without limitation.

As shown in FIG. 15, when superabrasive element 10 is positioned within protective leaching cup 30, at least a portion of superabrasive element 10 may be positioned adjacent to and/or contacting a portion of protective leaching cup 30. For example, seal region 38 of protective leaching cup 30 may be configured to contact at least a portion of element side surface 15 of superabrasive element 10, forming a seal between protective leaching cup 30 and superabrasive element 10 that is partially or fully impermeable to various fluids, such as a leaching material (e.g., a leaching solution). As shown in FIG. 15, superabrasive element 10 may be positioned within protective leaching cup 30 so that seal region 38 of protective leaching cup 30 contacts and forms a seal with at least a portion of element side surface 15, such as at least a portion of superabrasive side surface 22 and/or at least a portion of substrate side surface 16. In some embodiments, at least a portion of seal region 38 of protective leaching cup 30 may have an inner diameter $ID_1$ that is equal to or less than (e.g., when unassembled with superabrasive element 10) an outer diameter $OD_1$ of superabrasive element 10 (e.g., inner diameter $ID_1$ and outer diameter $OD_1$ illustrated in FIGS. 2 and 4). Accordingly, at least a portion of side wall 34 in seal region 38 of protective leaching cup 30 may contact and/or form a seal with at least a portion of superabrasive element 10.

In certain embodiments, prior to loading superabrasive element 10 and protective layer 648 into protective leaching cup 30, protective leaching cup 30 may be preheated to an elevated temperature. For example, protective leaching cup 30 may be heated to a softening point at which the material forming protective leaching cup 30 is suitably softened. Heating protective leaching cup 30 to a suitable temperature may facilitate positioning of superabrasive element 10 and protective layer 648 within protective leaching cup 30. For example, heating protective leaching cup 30 to a suitable temperature may cause protective leaching cup 30 to expand and/or provide an enhanced ability to deform to ease the placement and positioning of superabrasive element 10 within protective leaching cup 30 and to prevent portions of protective leaching cup 30 from being damaged by protective layer 648 during loading. Heating protective leaching cup 30 may also enable a more secure or effective seal to be formed between protective leaching cup 30 and protective layer 648, thereby further inhibiting passage of a leaching agent between protective leaching cup 30 and protective layer 648. Protective leaching cup 30 may be heated to any temperature suitable for softening the material forming protective leaching cup 30 to a desired extent. In at least one embodiment, a protective leaching cup 30 comprising a polyethylene material, such as linear low-density polyethylene (LLDPE), may be heated for a time sufficient for protective leaching cup 30 to reach a temperature of between about 130° F. and about 180° F.

According to various embodiments, superabrasive element 10 and/or protective layer 648 may be processed prior to loading superabrasive element 10 and protective layer 648 into protective leaching cup 30 in order to provide a smoother surface on an exterior portion of superabrasive element 10 and/or protective layer 648. For example, exterior portions of superabrasive element 10 that come into contact with protective leaching cup 30 may be processed to reduce surface imperfections. Superabrasive element 10 and/or protective layer 648 may be smoothed and/or polished using any suitable mechanical, chemical, and/or electrical processing technique to reduce surface imperfections or improve surface finish, without limitation. Due to the improved smoothness of protective layer 648, substrate side surface 16 of superabrasive element 10, and/or at least a portion of protective leaching cup 30, a seal between superabrasive side surface 22 and/or substrate side surface 16 and a portion of protective leaching cup 30, such as side wall 34 in seal region 38, abutting superabrasive side surface 22 and/or substrate side surface 16 may be improved, thereby inhibiting passage of a leaching agent between superabrasive element 10 and protective leaching cup 30. Materials forming protective leaching cup 30 may also be selected and processed so as to improve a seal between at least a portion of protective layer 648 and protective leaching cup 30.

Subsequent to loading superabrasive element 10 and protective layer 648 and into protective leaching cup 30 and prior to leaching, at least a portion of trapped gases, such as air and/or other gases, may be at least partially evacuated from between superabrasive element 10 and/or protective layer 648 and protective leaching cup 30. For example, portions of side wall 34 may be pushed outward away from superabrasive element 10 and protective layer 648 so as to facilitate evacuation of gases trapped within protective leaching cup 30, as will be described in greater detail below with reference to FIGS. 20 and 21.

By maintaining a seal between superabrasive element 10 and protective leaching cup 30 during leaching, portions of superabrasive element 10 may be prevented or inhibited from being exposed to a leaching agent during leaching, thereby preventing damage, such as corrosion damage, to certain regions of superabrasive element 10, such as substrate 12. Additionally, various regions of superabrasive element 10, such as superabrasive face 20 and/or superabrasive chamfer 24, may not be covered by protective leaching cup 30 and may remain exposed to a leaching agent during leaching, enabling leaching of such regions to achieve a desired leach depth/shape configuration.

Protective layer 648, which surrounds at least a portion of superabrasive element 10, including at least a portion of substrate 12, may additionally prevent a leaching agent from contacting substrate 12 during and/or following leaching. For example, pinholes, which may be formed in protective leaching cup 30 during ejection of superabrasive element 10 from a leaching apparatus following a leaching procedure, may allow a leaching agent to contact protective layer 648. A portion of protective layer 648 disposed between rear wall 32 of protective leaching cup 30 and rear surface 18 of superabrasive element 10, may inhibit or prevent a leaching agent, such as a leaching agent entering protective leaching cup 30 through rear wall 32, from contacting rear surface 18 of superabrasive element 10. A portion of protective layer 648 disposed between element side surface 15 of superabrasive element 10 and side wall 34 of protective leaching cup 30 may further prevent a leaching agent from contacting at least a portion of substrate side surface 16 of superabrasive element 10. Accordingly, protective layer 648 may further inhibit or prevent damage, such as corrosion damage, to various regions of superabrasive element 10, such as substrate 12, during and/or following leaching.

Figure 16:
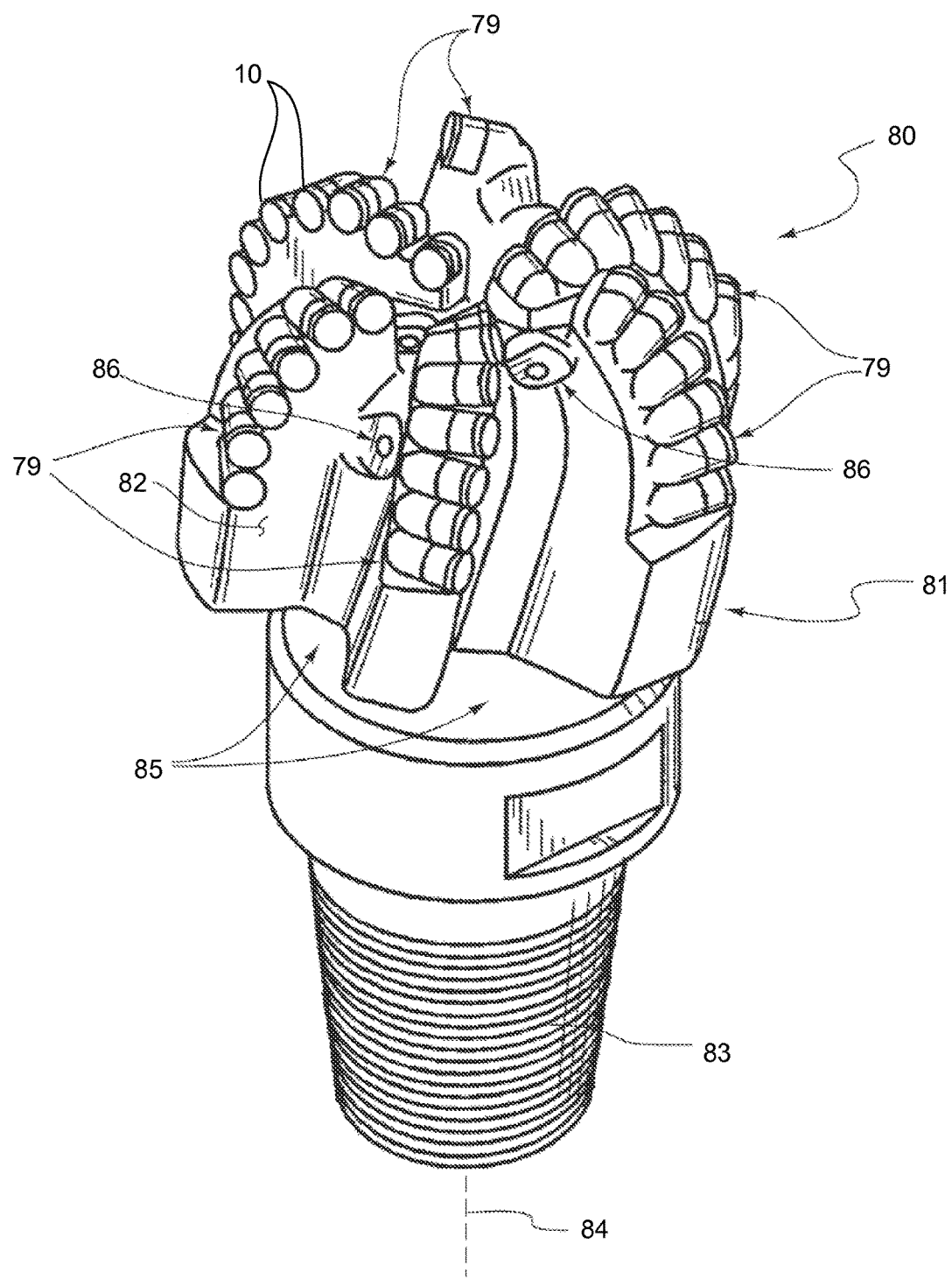
FIG. 16 is a perspective view of an exemplary drill bit according to at least one embodiment.

FIG. 16 is a perspective view of an exemplary drill bit 80 according to at least one embodiment. Drill bit 80 may represent any type or form of earth-boring or drilling tool, including, for example, a rotary drill bit. As illustrated in FIG. 16, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element 10 and/or at least one superabrasive element 310 may be coupled to bit body 81. For example, as shown in FIG. 16, a plurality of superabrasive elements 10 may be coupled to blades 79. Drill bit 80 may utilize any of the disclosed superabrasive elements 10 as cutting elements. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

FIG. 16 depicts an example of a drill bit 80 that employs at least one cutting element 10. Drill bit 80 may additionally represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some embodiments, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,448,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 17:
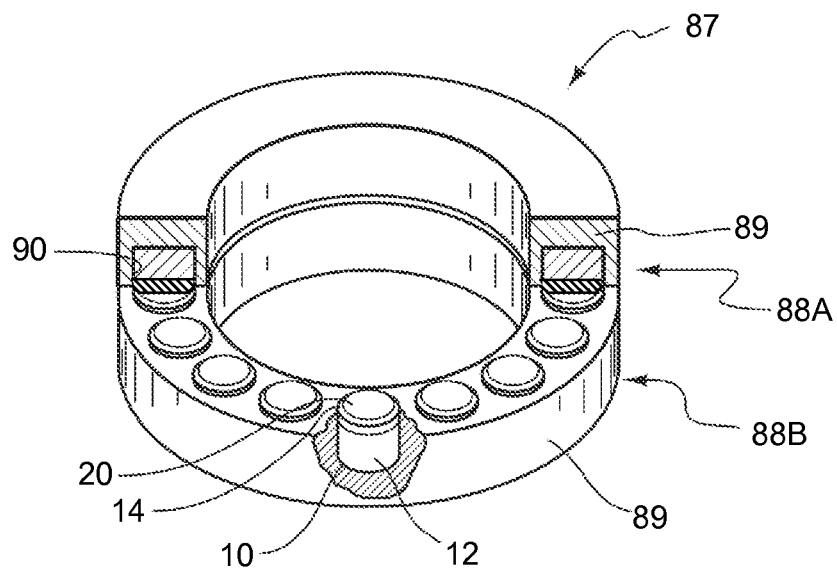
FIG. 17 is a partial cut-away perspective view of an exemplary thrust bearing apparatus according to at least one embodiment.

FIG. 17 is partial cross-sectional perspective view of an exemplary thrust-bearing apparatus 87 according to at least one embodiment. Thrust-bearing apparatus 87 may utilize any of the disclosed superabrasive elements 10 and/or superabrasive elements 310 as bearing elements. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In at least one embodiment, one or more of superabrasive elements 10 may be configured according to any of the superabrasive element embodiments described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87, as illustrated in FIG. 17. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 18:
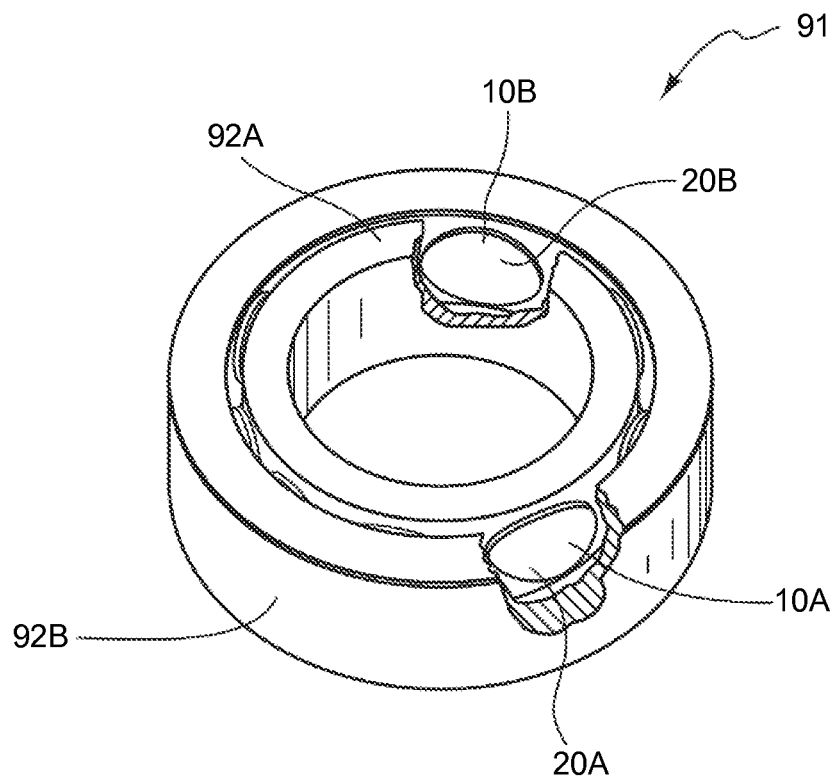
FIG. 18 is a partial cut-away perspective view of an exemplary radial bearing apparatus according to at least one embodiment.

FIG. 18 is a perspective view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 19:
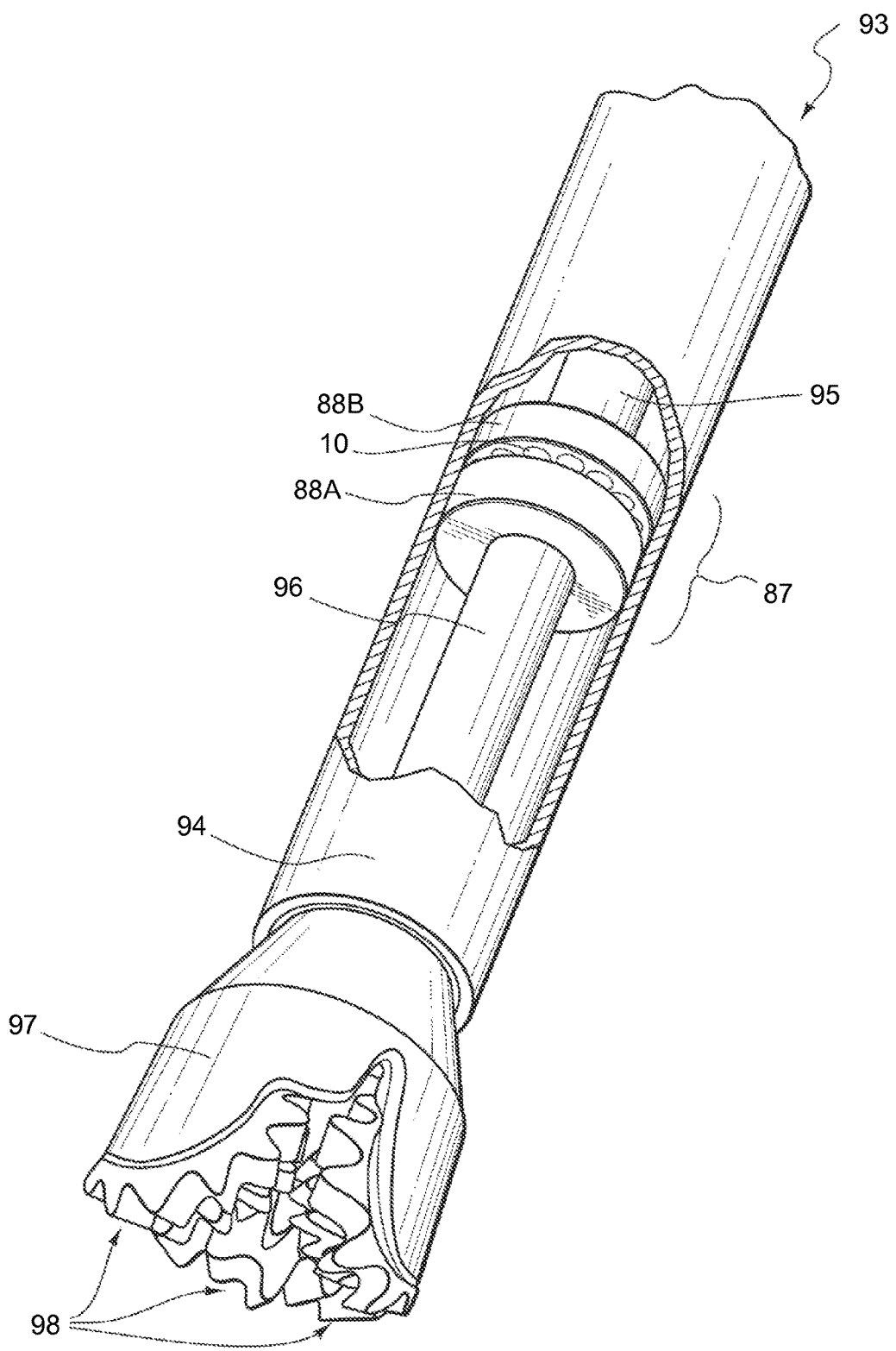
FIG. 19 is a partial cut-away perspective view of an exemplary subterranean drilling system according to at least one embodiment.

FIG. 19 is a partial cross-sectional perspective view of an exemplary subterranean drilling system 93 that includes a thrust-bearing apparatus 87, as shown in FIG. 16, according to at least one embodiment. The subterranean drilling system 93 may include a housing 94 enclosing a downhole drilling motor 95 (i.e., a motor, turbine, or any other suitable device capable of rotating an output shaft, without limitation) that is operably connected to an output shaft 96.

The thrust-bearing apparatus 87 shown in FIG. 16 may be operably coupled to downhole drilling motor 95. A rotary drill bit 97, such as a rotary drill bit configured to engage a subterranean formation and drill a borehole, may be connected to output shaft 96. As illustrated in FIG. 19, rotary drill bit 97 may be a roller cone bit comprising a plurality of roller cones 98. According to additional embodiments, rotary drill bit 97 may comprise any suitable type of rotary drill bit, such as, for example, a so-called fixed-cutter drill bit. As a borehole is drilled using rotary drill bit 97, pipe sections may be connected to subterranean drilling system 93 to form a drill string capable of progressively drilling the borehole to a greater depth within a subterranean formation.

A thrust-bearing assembly 88A in thrust-bearing apparatus 87 may be configured as a rotor that is attached to output shaft 96 and a thrust-bearing assembly 88B in thrust-bearing apparatus 87 may be configured as a stator. During a drilling operation using subterranean drilling system 93, the rotor may rotate in conjunction with output shaft 96 and the stator may remain substantially stationary relative to the rotor.

According to various embodiments, drilling fluid may be circulated through downhole drilling motor 95 to generate torque and effect rotation of output shaft 96 and rotary drill bit 97 attached thereto so that a borehole may be drilled. A portion of the drilling fluid may also be used to lubricate opposing bearing surfaces of superabrasive elements 10 on thrust-bearing assemblies 88A and 88B.

According to various embodiments, subsequent to loading a superabrasive element into a protective leaching cup and prior to leaching, at least a portion of trapped gases, such as air and/or other gases, may be at least partially evacuated from between the superabrasive element and/or a protective layer and protective leaching cup. For example, portions of a side wall of the protective leaching cup may be pushed outward away from the superabrasive element and the protective layer so as to facilitate evacuation of gases trapped within protective the leaching cup. In some embodiments, an expansion apparatus may be utilized for such purposes.

Figure 20:
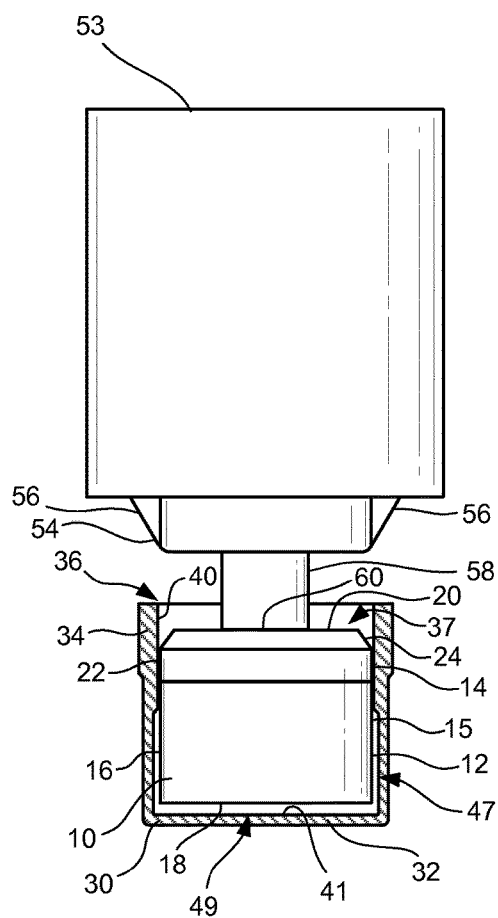
FIG. 20 is a partial cross-sectional side view of an exemplary expansion apparatus and an exemplary superabrasive element positioned within an exemplary protective leaching cup.
Figure 21:
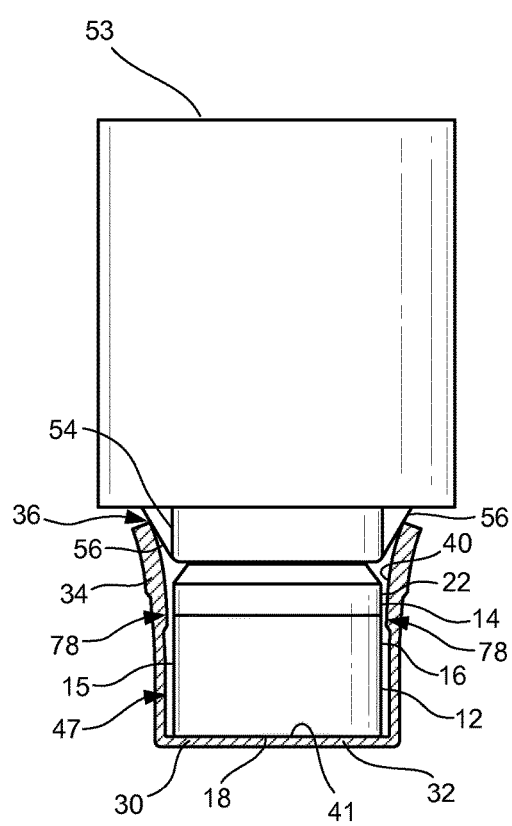
FIG. 21 is a partial cross-sectional side view of an exemplary expansion apparatus and an exemplary superabrasive element positioned within an exemplary protective leaching cup.

FIG. 20 illustrates an expansion apparatus 53 abutting a superabrasive element 10 disposed within a protective leaching cup 30 and FIG. 21 shows expansion apparatus 53 expanding a portion of protective leaching cup 30 to at least partially evacuate gases trapped between superabrasive element 10 and protective leaching cup 30 according to at least one embodiment. Superabrasive element 10 may be positioned in protective leaching cup 30, as shown in FIG. 20. For example, superabrasive element 10 may be loaded into protective leaching cup 30 by hand, by an arbor press, or as otherwise desired. As superabrasive element 10 is loaded into protective leaching cup 30, gases, such as air, may become trapped between superabrasive element 10 and/or a protective layer (e.g., protective layer 48 illustrated in FIG. 8) and protective leaching cup 30.

Portions of protective leaching cup 30 (e.g., seal region 40 adjacent opening 36 as illustrated in FIG. 4) may form a seal around portions of superabrasive element 10 and/or the protective layer, such as superabrasive side surface 22 and/or substrate side surface 16, inhibiting the trapped gases from escaping. In at least one embodiment, such trapped gases may cause a rear wall gap 49 to be formed between rear face 18 of superabrasive element 10 and inner rear surface 41 of protective leaching cup 30, preventing proper positioning of superabrasive element 10 in protective leaching cup 30. As illustrated in FIG. 20, expansion apparatus 53 may be positioned within cavity 37 of protective leaching cup 30 adjacent superabrasive element 10 so that a contact face 60 of a contact member 58 of expansion apparatus 53 abuts superabrasive face 20 of superabrasive element 10.

Main body 52 of expansion apparatus 53 may then be forced toward superabrasive element 10 from the position illustrated in FIG. 20 to the position illustrated in FIG. 21. As main body 52 is forced toward superabrasive element 10, sloped portions 56 of an expansion feature 54 of expansion apparatus 53 may contact at least a portion of side wall 34 of protective leaching cup 30. For example, sloped portions 56 may contact portions of inner side surface 40 of side wall 34 adjacent opening 36. According to at least one embodiment, a width between sloped portions 56 may increase from a width that is less than an inner diameter of protective leaching cup 30 to a width that is greater than the inner diameter of protective leaching cup 30. Accordingly, expansion feature 54 of expansion apparatus 53 may be inserted through opening 36 of protective leaching cup 30 and may expand or bend portions of protective leaching cup 30 (e.g., at least a portion of seal region 40 illustrated in FIG. 4) outward and away from superabrasive element 10 and/or a protective layer formed on superabrasive element 10.

As portions of protective leaching cup 30 are forced outward by expansion apparatus 53, at least one expansion gap 78 may be formed between protective leaching cup 30 and superabrasive element 10. For example, as shown in FIG. 21, expansion gaps 78 may be formed between inner side surface 40 of protective leaching cup 30 and element side surface 15 of superabrasive element 10. Expansion gaps 78 may each provide a passage enabling gases trapped between protective leaching cup 30 and superabrasive element 10 to be at least partially evacuated from protective leaching cup 30. Side wall gap 47 may facilitate migration of trapped gases to expansion gaps 78 from various regions of protective leaching cup 30, including, for example, gases trapped in rear wall gap 49 shown in FIG. 20. According to some embodiments, as gases are evacuated from protective leaching cup 30, superabrasive element 10 may be forced toward rear wall 32 of protective leaching cup 30 so that rear face 18 of superabrasive element 10 abuts inner rear surface 41 of rear wall 32.

Expansion feature 54 of expansion apparatus 53 may then be removed from protective leaching cup 30. According to some embodiments, a biasing member within expansion apparatus may force contact member 58 against superabrasive element 10, thereby facilitating removal of expansion apparatus 53 from protective leaching cup 30 as an external force directing main body 52 toward superabrasive element 10 is decreased. As expansion apparatus 53 is removed from protective leaching cup 30, portions of protective leaching cup 30 that were expanded or deformed by expansion apparatus 53, such as portions of side wall 34 (e.g., portions of seal region 40 illustrated in FIG. 5), may come back into contact with superabrasive element 10, thereby forming a seal again between protective leaching cup 30 and superabrasive element 10 and/or a protective layer formed on superabrasive element 10.

Figure 22:
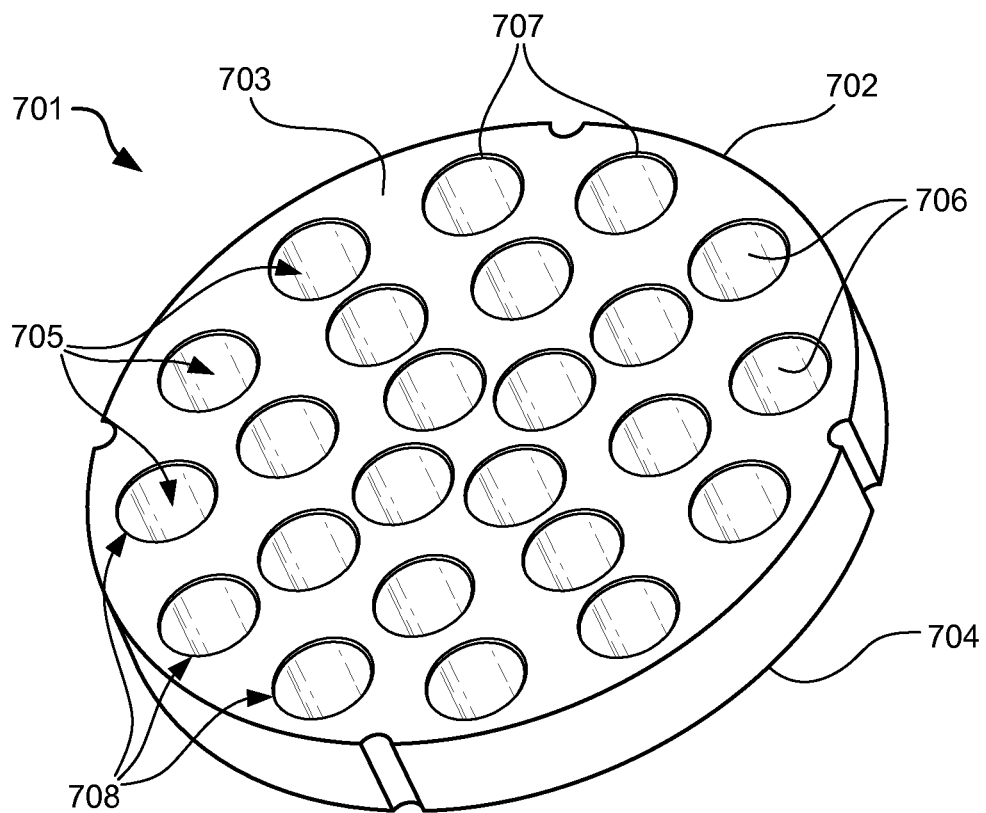
FIG. 22 is a perspective view of an exemplary leaching tray for processing superabrasive elements according to at least one embodiment.
Figure 23:
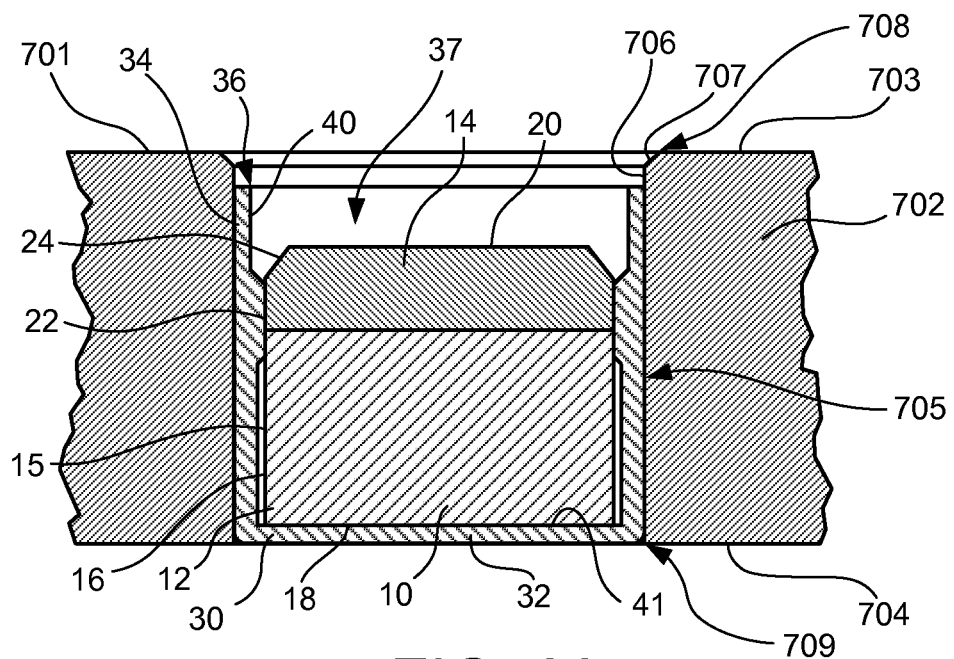
FIG. 23 is a cross-sectional side view of a portion of an exemplary leaching tray and an exemplary superabrasive element and protective leaching cup positioned within the leaching tray according to at least one embodiment.

FIGS. 22 and 23 show an exemplary leaching tray 701 for processing superabrasive elements according to at least one embodiment. As illustrated in FIG. 22, leaching tray 701 may comprise a tray body 702 having a front surface 703 and a back surface 704. Tray body 702 may comprise any suitable shape, such as, for example, a substantially disk-shaped body. According to various embodiments, a plurality of tray holes 705 may be formed in tray body 702. Tray holes 705 may each be configured to hold a protective leaching cup (e.g., protective leaching cup 30 illustrated in FIGS. 3-9B). As illustrated in FIG. 23, tray holes 705 may comprise through-holes extending through the entire thickness of tray body 702, from front openings 708 defined in front surface 703 to back openings 709 defined in back surface 704. In some embodiments, tray holes 705 may extend only partially through tray body 702 so that tray holes 705 are open to either front surface 703 or back surface 704. Each tray hole 705 may be defined by a hole surface 706 and a hole chamfer 707 extending between front surface 703 and hole surface 706. In some embodiments, tray hole 705 may also be defined by a hole chamfer extending between back surface 704 and hole surface 706. Hole surface 706 may comprise any suitable shape, without limitation, including, for example, a substantially cylindrical shape.

As shown in FIG. 22, a protective leaching cup 30 having a superabrasive element 10 disposed therein may be positioned within a tray hole 705. According to at least one embodiment, protective leaching cup 30 may be loaded into tray hole 705 by inserting protective leaching cup 30 into tray hole 705 through a front opening 708 defined in front surface 703. For example, protective leaching cup 30 may be introduced into tray hole 705 so that rear wall 32 of protective leaching cup 30 is introduced into tray hole 705 first. According to some embodiments, hole chamfer 707 extending between tray hole 705 and front surface 703 may facilitate entry of protective leaching cup 30 into tray hole 705 by providing a surface that slopes into tray hole 705. The sloped surface of hole chamfer 707 may guide protective leaching cup 30 into tray hole 705 while preventing damage to protective leaching cup 30 due to a sharp and/or uneven corner between tray hole 705 and front surface 703. Protective leaching cup 30 may be positioned within tray hole 705 so that protective leaching cup 30 does not project past either front surface 703 or back surface 704 of tray body 702. Hole surface 706 defining tray hole 705 may have an inner diameter that is approximately the same as or smaller than an outer diameter of protective leaching cup 30. Accordingly, hole surface 706 may closely surround and/or abut protective leaching cup 30 such that protective leaching cup 30, and superabrasive element 10 disposed therein, may be secured within leaching tray 701 during leaching. Further, an appropriate interference fit between hole surface 706 and protective leaching cup 30 may also facilitate and/or maintain a seal between superabrasive element 10 and protective leaching cup 30.

Following positioning of protective leaching cup 30 within tray hole 705, leaching tray 701 may be exposed to a leaching agent. For example, leaching tray 701 may be at least partially submerged within a leaching solution in such a manner that the leaching solution enters cavity 37 of protective leaching cup 30 and contacts at least a portion of superabrasive table 14 of superabrasive element 10 during leaching. In some examples, leaching tray 701 may be fully submerged in the leaching solution. In additional examples, leaching tray 701 may be only partially submerged in the leaching solution, with front face 703 of tray body 702 being placed in contact with the leaching solution. Following leaching, protective leaching cup 30 and superabrasive element 10 may be removed from leaching tray 701 by pushing protective leaching cup 30 through front opening 708 defined in front surface 703 or back opening 709 defined in back surface 704. According to various embodiments, leaching tray 701 may comprise a corrosion resistant material, such as stainless steel or a polymeric material, without limitation, that resists corrosion due to exposure to a leaching agent. Leaching tray 701 may therefore be suitably reused for subsequent leaching operations.

Figure 24:
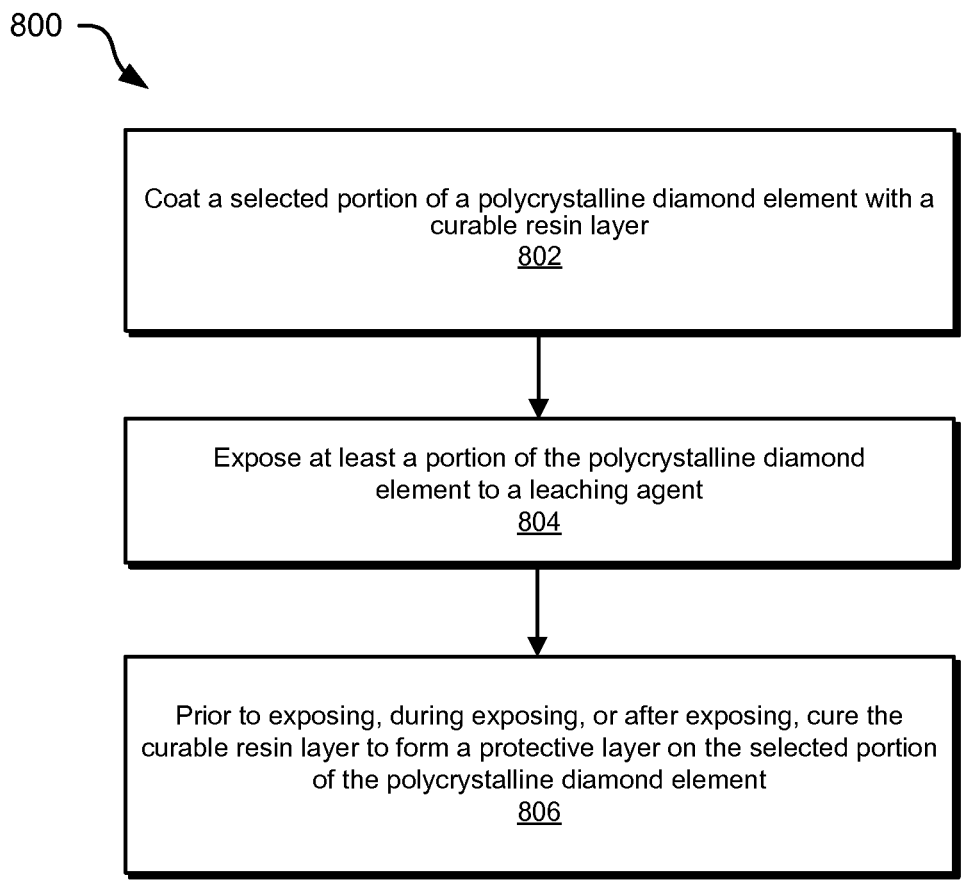
FIG. 24 is a flow diagram of an exemplary method of processing a polycrystalline diamond element according to at least one embodiment.

FIG. 24 illustrates an exemplary method 700 for processing a polycrystalline diamond element according to at least one embodiment. As shown in FIG. 24, a selected portion of a polycrystalline diamond element may be coated with a curable resin layer (process 802). In some embodiments, a curable material 42 may be formed over at least a portion of superabrasive element 10, as illustrated in FIGS. 5-7. As illustrated in FIG. 7, curable material 42 may be formed on various portions of superabrasive element 10, including, for example, at least a portion of rear surface 18, substrate chamfer 28, and element side surface 15 of superabrasive element 10.

At least a portion of the polycrystalline diamond element may be exposed to a leaching agent (process 804). For example, as shown in FIGS. 12 and 13, protective layer 448 may be formed on superabrasive element 10 such that portions of superabrasive table 14, such as superabrasive face 20 and/or superabrasive chamfer 24, are not covered by protective layer 448. Superabrasive element 10 and protective layer 448 may then be exposed to a leaching agent in any suitable manner. For example, superabrasive element 10 and protective layer 448 may be at least partially submerged in a leaching agent that is suitable for leaching various materials from the exposed portions of superabrasive table 14. In at least one embodiment, a corrosive leaching agent may be used to remove a metal-solvent catalyst from interstitial spaces between diamond grains in superabrasive table 14. According to various embodiments, the leaching agent may comprise various solvents, acids, and/or other suitable reagents, including, without limitation, water, peroxide, nitric acid, hydrofluoric acid, and/or hydrochloric acid. Superabrasive element 10 may be exposed to the leaching agent for any suitable period of time. For example, superabrasive element 10 may be exposed to the leaching agent until various interstitial materials, such as, for example, a metal-solvent catalyst, are removed from superabrasive table 14 to a desired depth or degree.

Prior to exposing, during exposing, and/or after exposing the polycrystalline diamond element to the leaching agent, the curable resin layer may be cured to form a protective layer on the selected portion of the polycrystalline diamond element (process 806). For example, as illustrated in FIGS. 7 and 8, curable material 42 may be partially or fully cured to form protective layer 48 on at least a portion of superabrasive element 10 (see also, protective layer 448 formed on at least a portion of superabrasive element 10 as illustrated in FIGS. 12 and 13).

Figure 25:
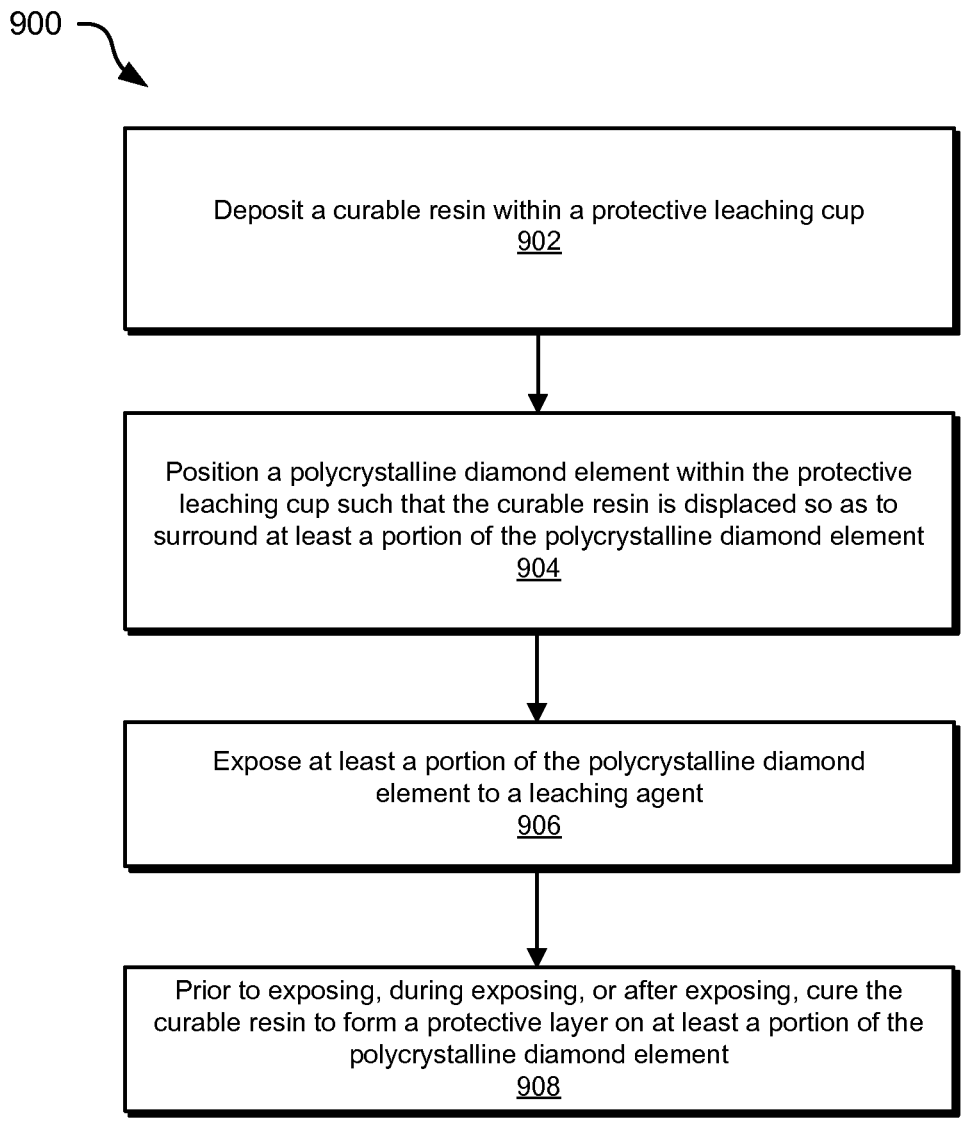
FIG. 25 is a flow diagram of an exemplary method of processing a polycrystalline diamond element according to at least one embodiment.

FIG. 25 illustrates an exemplary method 900 for processing a polycrystalline diamond element according to at least one embodiment. As shown in FIG. 25, a curable resin may be deposited within a protective leaching cup (process 902). For example, as shown in FIG. 5, prior to positioning superabrasive element 10 with protective leaching cup 30, a volume of curable material 42 may be disposed within protective leaching cup 30.

A polycrystalline diamond element may then be positioned within the protective leaching cup (process 904). As the polycrystalline diamond element is positioned within the protective leaching cup, the curable resin may be displaced so as to surround at least a portion of the polycrystalline diamond element. As illustrated in FIGS. 6 and 7, for example, curable material 42 may surround at least a portion of substrate 12 of superabrasive element 10 within encapsulating region 39 of protective leaching cup 30. As superabrasive element 10 is further inserted into and positioned within protective leaching cup 30, curable material 42 may partially or substantially fill a gap 46 defined between element side surface 15 of superabrasive element 10 and inner side surface 40 of protective leaching cup 30.

At least a portion of the polycrystalline diamond element may be exposed to a leaching agent (process 906). For example, as shown in FIG. 8, superabrasive element 10 may be positioned within protective leaching cup 30 so that portions of superabrasive table 14, such as superabrasive face 20 and/or superabrasive chamfer 24, are not covered by protective leaching cup 30. Superabrasive element 10 and protective layer 448 may then be exposed to a leaching agent in any suitable manner.

Prior to exposing, during exposing, and/or after exposing the polycrystalline diamond element to the leaching agent, the curable resin layer may be cured to form a protective layer on at least a portion of the polycrystalline diamond element (process 908). For example, as illustrated in FIG. 8, curable material 42 may be partially or fully cured to form protective layer 48 on at least a portion of superabrasive element 10 within encapsulating region 39 of protective leaching cup 30.

Figure 26:
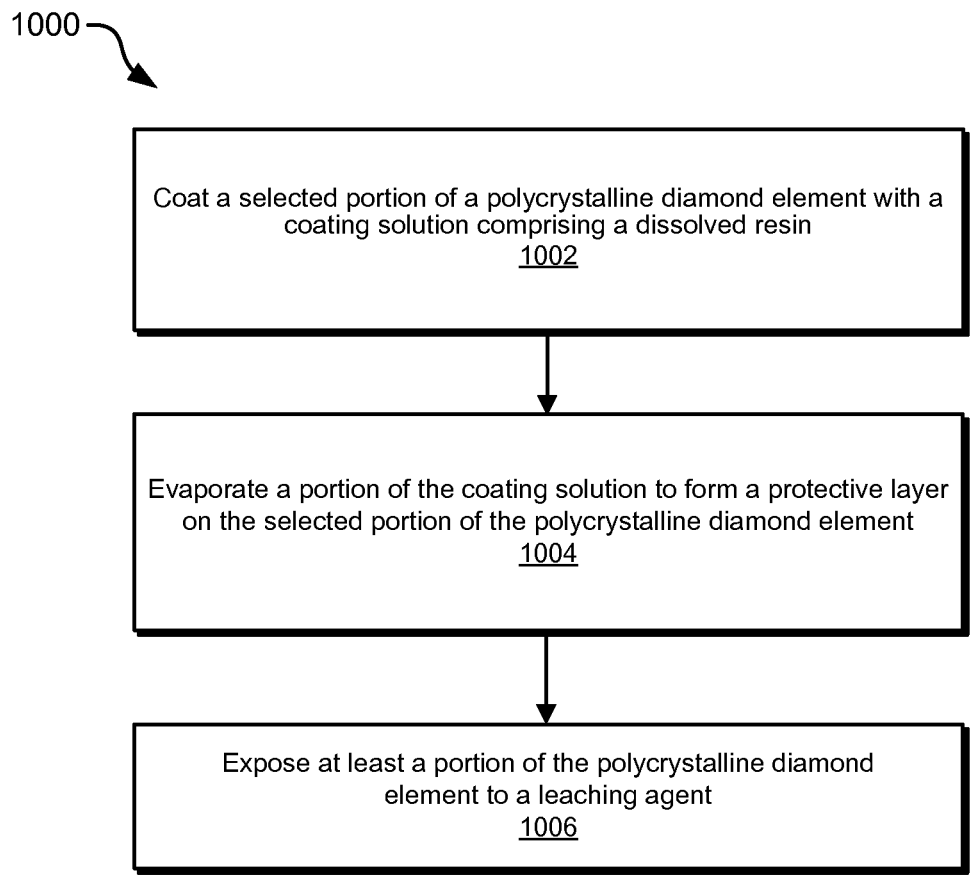
FIG. 26 is a flow diagram of an exemplary method of processing a polycrystalline diamond element according to at least one embodiment.

FIG. 26 illustrates an exemplary method 1000 for processing a polycrystalline diamond element according to at least one embodiment. As shown in FIG. 26, a selected portion of a polycrystalline diamond element may be coated with a coating solution comprising a dissolved resin (process 1002). For example, a protective layer 448 shown in FIGS. 12 and 13 comprising a fluorine-based coating may be formed on superabrasive element 10 by depositing a coating solution comprising a fluorine coating resin dissolved in a solvent onto exterior portions of superabrasive element 10. The coating solution may be deposited on various portions of superabrasive element 10, including, for example, at least a portion of rear surface 18, substrate chamfer 28, and element side surface 15 of superabrasive element 10.

A portion of the coating solution may then be evaporated to form a protective layer on the selected portion of the polycrystalline diamond element. (process 1004). For example, as illustrated in FIG. 8, a solvent portion of the fluorine-based coating solution may be evaporated to form protective layer 448 on superabrasive element 10, as illustrated in FIGS. 12 and 13.

At least a portion of the polycrystalline diamond element may then be exposed to a leaching agent (process 1006). For example, as shown in FIGS. 12 and 13, protective layer 448 may be formed on superabrasive element 10 such that portions of superabrasive table 14, such as superabrasive face 20 and/or superabrasive chamfer 24, are not covered by protective layer 448. Superabrasive element 10 and protective layer 448 may then be exposed to a leaching agent in any suitable manner.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of processing a polycrystalline diamond element, the method comprising:
    depositing a curable material within a protective leaching cup, the protective leaching cup including a rear wall and a side wall, the side wall comprising:
        a seal region having a first inner diameter;
        an encapsulating region extending between the seal region and the rear wall, the encapsulating region having a second inner diameter that is greater than the first inner diameter;
    positioning a polycrystalline diamond element, which comprises a polycrystalline diamond table bonded to a substrate, within the protective leaching cup such that:
        the curable material is disposed within the encapsulating region so as to surround at least a portion of the substrate;
        the curable material does not contact the polycrystalline diamond table;
        the curable material does not occupy a region of volume defined between the substrate and the protective leaching cup;
    curing the curable material to form a protective layer on at least the portion of the substrate;
    exposing at least a portion of the polycrystalline diamond element to a leaching agent such that the leaching agent contacts an exposed surface region of the polycrystalline diamond table.

2. The method of claim 1, wherein:
    the protective leaching cup comprises an opening defined in a portion of the protective leaching cup opposite the rear wall;
    the side wall extends between the opening and the rear wall, the side wall and the rear wall defining a cavity within the protective leaching cup.

3. The method of claim 2, wherein depositing the curable material within the protective leaching cup comprises depositing the curable material adjacent the rear wall of the protective leaching cup.

4. The method of claim 2, wherein the curable material does not occupy a region of volume defined between the substrate and the rear wall of the protective leaching cup.

5. The method of claim 1, wherein:
    the polycrystalline diamond element comprises:
        a cutting face;
        a rear face opposite the cutting face;
        a side surface extending between the cutting face and the rear face;
    positioning the polycrystalline diamond element within the protective leaching cup comprises:
        forcing the substrate against the curable material such that the curable material is displaced within the encapsulating region of the protective leaching cup.

6. The method of claim 1, wherein the seal region of the protective leaching cup tightly surrounds at least a portion of the side surface of the polycrystalline diamond table so as to form a seal between the seal region and the side surface.

7. The method of claim 1, wherein curing the curable material comprises exposing the curable material to light.

8. The method of claim 7, wherein:
the protective leaching cup comprises a light-transmissive material; and
exposing the curable material to the light further comprises transmitting the light through at least a portion of the side wall of the protective leaching cup.

9. The method of claim 7, wherein the light comprises near-ultraviolet light.

10. The method of claim 1, wherein curing the curable material comprises heating the curable material to at least a threshold temperature.

11. The method of claim 1, wherein exposing at least the portion of the polycrystalline diamond element to the leaching agent comprises submerging at least the portion of the polycrystalline diamond table and at least a portion of the protective leaching cup in the leaching agent.

12. The method of claim 1, wherein the seal region contacts a portion of the polycrystalline diamond table.

13. The method of claim 1, wherein positioning the polycrystalline diamond element within the protective leaching cup further comprises forcing at least a portion of the seal region of the side wall outward and away from the polycrystalline diamond element.

14. The method of claim 13, wherein positioning the polycrystalline diamond element within the protective leaching cup further comprises defining a gap between at least the portion of the seal region of the side wall and the polycrystalline diamond element.

15. The method of claim 1, wherein the substrate comprises a chamfer.

16. The method of claim 1, wherein the protective layer does not occupy the region of volume defined between the substrate and the protective leaching cup.

* * * * *